US012568520B2

(12) United States Patent

Cho et al.

(10) Patent No.: US 12,568,520 B2

(45) Date of Patent: Mar. 3, 2026

(54) ELECTRONIC DEVICE COMPRISING PLURALITY OF SUBSCRIBER IDENTIFICATION MODULES AND OPERATION METHOD OF SAME

(71) Applicant: SAMSUNG ELECTRONICS CO., LTD., Suwon-si (KR)

(72) Inventors: Seungmoo Cho, Suwon-si (KR); Sanghyun Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 343 days.

(21) Appl. No.: 18/315,134

(22) Filed: May 10, 2023

(65) Prior Publication Data

US 2023/0284258 A1 Sep. 7, 2023

Related U.S. Application Data

(63) Continuation of application No. PCT/KR2021/016885, filed on Nov. 17, 2021.

(30) Foreign Application Priority Data

Dec. 31, 2020 (KR) ......................... 10-2020-0188870

(51) Int. Cl.
| | |
|---|---|
| *H04W 72/566* | (2023.01) |
| *H04W 72/0453* | (2023.01) |
| *H04W 88/06* | (2009.01) |

(52) U.S. Cl.
CPC ..... *H04W 72/566* (2023.01); *H04W 72/0453* (2013.01); *H04W 88/06* (2013.01)

(58) Field of Classification Search
CPC ........... H04W 72/566; H04W 72/0453; H04W 8/183; H04W 72/1215; H04W 72/56;

(Continued)

(56) References Cited

U.S. PATENT DOCUMENTS

| | | | |
|---|---|---|---|
| 8,170,616 | B2 | 5/2012 | Lee |
| 10,368,355 | B2 | 7/2019 | Lee |

(Continued)

FOREIGN PATENT DOCUMENTS

| | | |
|---|---|---|
| EP | 3344000 | 7/2018 |
| EP | 3591948 | 1/2020 |

(Continued)

OTHER PUBLICATIONS

International Search Report for PCT/KR2021/016885 mailed Feb. 18, 2022, 6 pages.

(Continued)

*Primary Examiner* — Vinncelas Louis

(74) *Attorney, Agent, or Firm* — Nixon & Vanderhye P.C.

(57) ABSTRACT

A device and/or a method for allocating radio resources in an electronic device. The electronic device may include: a plurality of SIMS and a processor, wherein the processor may be configured to: check the first priority of first communication with a first wireless network and the second priority of second communication with a second wireless network, wherein the first communication is based on first subscriber identification information and the second communication is based on second subscriber identification information; and allocate a transmission radio resource to the first communication and a reception radio resource to the second communication based on determining that a transmission radio resource is not being used in the second communication and the second priority being than the first priority.

20 Claims, 10 Drawing Sheets

(58) Field of Classification Search
CPC ..... H04W 88/06; H04W 8/186; H04W 16/14; H04W 72/21; H04W 72/569; H04W 56/001; H04W 68/12; H04W 88/08; H04W 48/18; H04L 5/0051
See application file for complete search history.

(56) References Cited

U.S. PATENT DOCUMENTS

| | | | |
|---|---|---|---|
| 10,893,478 B2 * | 1/2021 | Kim ................... | H04W 56/001 |
| 10,932,229 B2 | 2/2021 | Lou et al. | |
| 2009/0164638 A1 | 6/2009 | Jang et al. | |
| 2009/0312020 A1 | 12/2009 | Lee | |
| 2013/0150036 A1 | 6/2013 | Pattaswamy et al. | |
| 2014/0199993 A1 * | 7/2014 | Dhanda ................ | H04W 88/08 |
| | | | 455/423 |
| 2016/0227557 A1 | 8/2016 | Fanous et al. | |
| 2017/0048773 A1 * | 2/2017 | Miao ................... | H04W 48/18 |
| 2017/0223712 A1 | 8/2017 | Stephens et al. | |
| 2018/0160422 A1 | 6/2018 | Pathak et al. | |
| 2020/0037380 A1 * | 1/2020 | Qiu ...................... | H04W 68/12 |
| 2020/0245292 A1 | 7/2020 | Huang et al. | |
| 2021/0195392 A1 | 6/2021 | Kojima et al. | |
| 2021/0267000 A1 * | 8/2021 | Jain ...................... | H04W 8/245 |
| 2021/0345151 A1 | 11/2021 | Chen | |
| 2022/0303945 A1 | 9/2022 | Tsuda | |

FOREIGN PATENT DOCUMENTS

| | | | |
|---|---|---|---|
| JP | 2021048570 | A | 3/2021 |
| JP | 2021097380 | A | 6/2021 |
| JP | 2022062549 | A | 4/2022 |
| KR | 20090130981 | A | 12/2009 |
| KR | 20130066498 | A | 6/2013 |
| KR | 101466792 | B1 | 11/2014 |
| KR | 20150107808 | A | 9/2015 |
| KR | 20170141095 | A | 12/2017 |
| KR | 20180094146 | A | 8/2018 |
| KR | 20190131547 | A | 11/2019 |
| KR | 20200045358 | A | 5/2020 |
| KR | 102277026 | B1 | 7/2021 |
| KR | 20210115001 | A | 9/2021 |
| WO | 2016/122773 | | 8/2016 |

OTHER PUBLICATIONS

Written Opinion of the ISA for PCT/KR2021/016885 mailed Feb. 18, 2022, 4 pages.
Extended European Search Report dated Jan. 25, 2024 issued in European Patent Application No. 21915523.1.

* cited by examiner

RX RADIO RESOURCE (600)

TX RADIO RESOURCE (620)

ELECTRONIC DEVICE COMPRISING PLURALITY OF SUBSCRIBER IDENTIFICATION MODULES AND OPERATION METHOD OF SAME

CROSS-REFERENCE TO RELATED APPLICATIONS

This application is a continuation of International Application No. PCT/KR2021/016885 designating the United States, filed on Nov. 17, 2021, in the Korean Intellectual Property Receiving Office and claiming priority to Korean Patent Application No. 10-2020-0188870, filed on Dec. 31, 2020, in the Korean Intellectual Property Office, the disclosures of which are incorporated by reference herein in their entireties.

BACKGROUND

Field

The disclosure relates to an apparatus and method for allocating radio resources to a plurality of subscriber identity modules (SIMs) in an electronic device.

Description of Related Art

An electronic device may include a subscriber identity module (SIM) managing personal information to provide various functions such as user authentication, billing, and security to a user.

An electronic device may include a plurality of subscriber identity modules. For example, when an electronic device includes two subscriber identity modules, different network services may be provided through each subscriber identity module. As an example, an electronic device may be connected to a first wireless network based on a first subscriber identity module and connected to a second wireless network based on a second subscriber identity module.

An electronic device may independently use or share radio resources for wireless communication based on a plurality of subscriber identity modules. For example, when performing wireless communication based on the first subscriber identity module and the second subscriber identity module, the electronic device may independently use a radio resource (or a radio frequency (RF) path). For another example, when performing wireless communication based on the first subscriber identity module and the second subscriber identity module, the electronic device may share a radio resource (or an RF path). For another example, when performing wireless communication based on the first subscriber identity module and the second subscriber identity module, the electronic device may share a transmission radio resource (or a transmission RF path) and independently use a reception radio resource (or a reception RF path).

When an electronic device shares a radio resource (e.g., an RF path) for wireless communication based on a plurality of subscriber identity modules, wireless communication based on a plurality of subscriber identity modules may be limited at the same time. For example, when the electronic device occupies a radio resource (e.g., an RF path) for wireless communication based on the second subscriber identity module, wireless communication based on the first subscriber identity module may be limited.

A base station of a wireless communication system using a time division duplex (TDD) may transmit a signal (or data)

to an electronic device based on a channel state estimated using a signal (e.g., a sounding reference signal (SRS)) transmitted through uplink. However, when the wireless communication based on a specific subscriber identity module is limited in an electronic device having a plurality of subscriber identity modules, the base station may be limited in estimating a channel state related to the electronic device because the transmission of the uplink signal by the electronic device is limited. For example, when the electronic device occupies a radio resource (e.g., an RF path) for wireless communication based on the second subscriber identity module, transmission of a signal (e.g., SRS or ACK/NACK) for wireless communication based on the first subscriber identity module may be limited at a specified time. In this case, the base station cannot recognize a channel state related to the first subscriber identity module of the electronic device, and thus communication efficiency related to the first subscriber identity module may deteriorate. In addition, when the base station cannot receive ACK/NACK of data transmitted to the electronic device, unnecessary retransmission may occur.

SUMMARY

Embodiments of the disclosure disclose an apparatus and method for allocating radio resources to a plurality of subscriber identity modules (SIMs) in an electronic device.

According to various example embodiments, an electronic device may include: a first subscriber identity module storing first subscriber identity information, a second subscriber identity module storing second subscriber identity information, a wireless communication circuit including transmission radio resources and reception radio resources shared for communication with a first wireless network based on the first subscriber identity information and communication with a second wireless network based on the second subscriber identity information, and a processor operatively connected to the first subscriber identity module, the second subscriber identity module, and the wireless communication circuit, wherein the processor may be configured to: control the electronic device to communicate with the first wireless network based on the first subscriber identity information through the wireless communication circuit, identify priority of communication with the first wireless network and communication with the second wireless network based on it being necessary to use the wireless communication circuit to communicate with the second wireless network based on the second subscriber identity information, identify information related to the request for use of the wireless communication circuit from communication with the first wireless network and communication with the second wireless network based on communication with the second wireless network having a higher priority than communication with the first wireless network, allocate the transmission radio resource to communication with the first wireless network and allocate the reception radio resource to communication with the second wireless network based on determining that the transmission radio resource is not used in communication with the second wireless network based on the information related to the request for use of the wireless communication circuit, and in communication with the first wireless network, a reference signal and/or a control signal that does not require feedback from an external device through the transmission radio resource may be transmitted based on the reception radio resource being allocated to communication with the second wireless network while the transmission radio resource is allocated to communication with the first wireless network.

According to various example embodiments, a method of operating an electronic device may include: communicating with a first wireless network based on first subscriber identity information stored in a first subscriber identity module, identifying priority of communication with the first wireless network and communication with the second wireless network based on communication with the second wireless network based on second subscriber identity information stored in a second subscriber identity module being required, identifying information related to the request for use of the wireless communication circuit from communication with the first wireless network and communication with the second wireless network based on communication with the second wireless network having a higher priority than communication with the first wireless network, allocating transmission radio resources of the wireless communication circuit to communication with the first wireless network and allocating reception radio resources of the wireless communication circuit to communication with the second wireless network based on determining that the transmission radio resource is not used in communication with the second wireless network based on the information related to the request for use of the wireless communication circuit, and in communication with the first wireless network, a reference signal and/or a control signal that does not require feedback from an external device through the transmission radio resource may be transmitted based on the reception radio resource being allocated to communication with the second wireless network while the transmission radio resource is allocated to communication with the first wireless network.

According to various example embodiments of the disclosure, when a request to use a radio resource (e.g., a radio frequency (RF) path) for wireless communication with the second wireless network based on the second subscriber identity information stored in the second subscriber identity module is identified while performing wireless communication with the first wireless network based on the first subscriber identity information stored in the first subscriber identity module in an electronic device, performance degradation and unnecessary retransmission of wireless communication related to the subscriber identity module may be reduced by allocating a transmission radio resource (e.g., a transmission RF path) and a reception radio resource (e.g., a reception RF path) to communication with different wireless networks based on a request cause related to communication with the first wireless network and communication with the second wireless network.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Hereinafter, various example embodiments will be described in greater detail with reference to the accompanying drawings.

Figure 1:
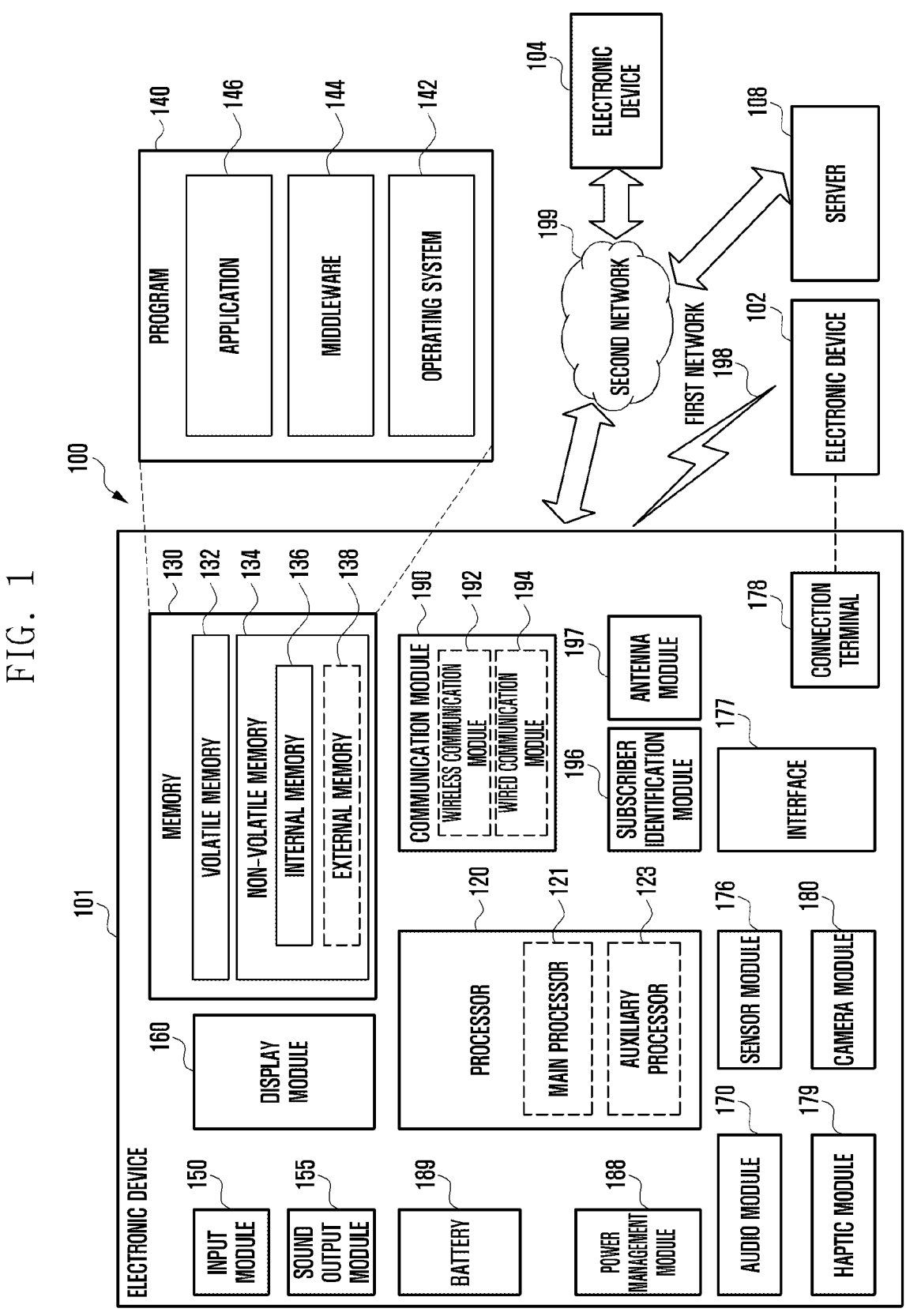
FIG. 1 is a block diagram illustrating an example electronic device in a network environment, according to various embodiments.

FIG. 1 is a block diagram illustrating an example electronic device 101 in a network environment 100 according to various embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In various embodiments, at least one of the components (e.g., the connecting terminal 178) may be omitted from the electronic device 101, or one or more other components may be added in the electronic device 101. In various embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™ wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC. According to an embodiment, the subscriber identification module 196 may include a plurality of subscriber identification modules. For example, the plurality of subscriber identification modules may store different subscriber information.

The antenna module 197 may transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used in connection with various embodiments of the disclosure, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
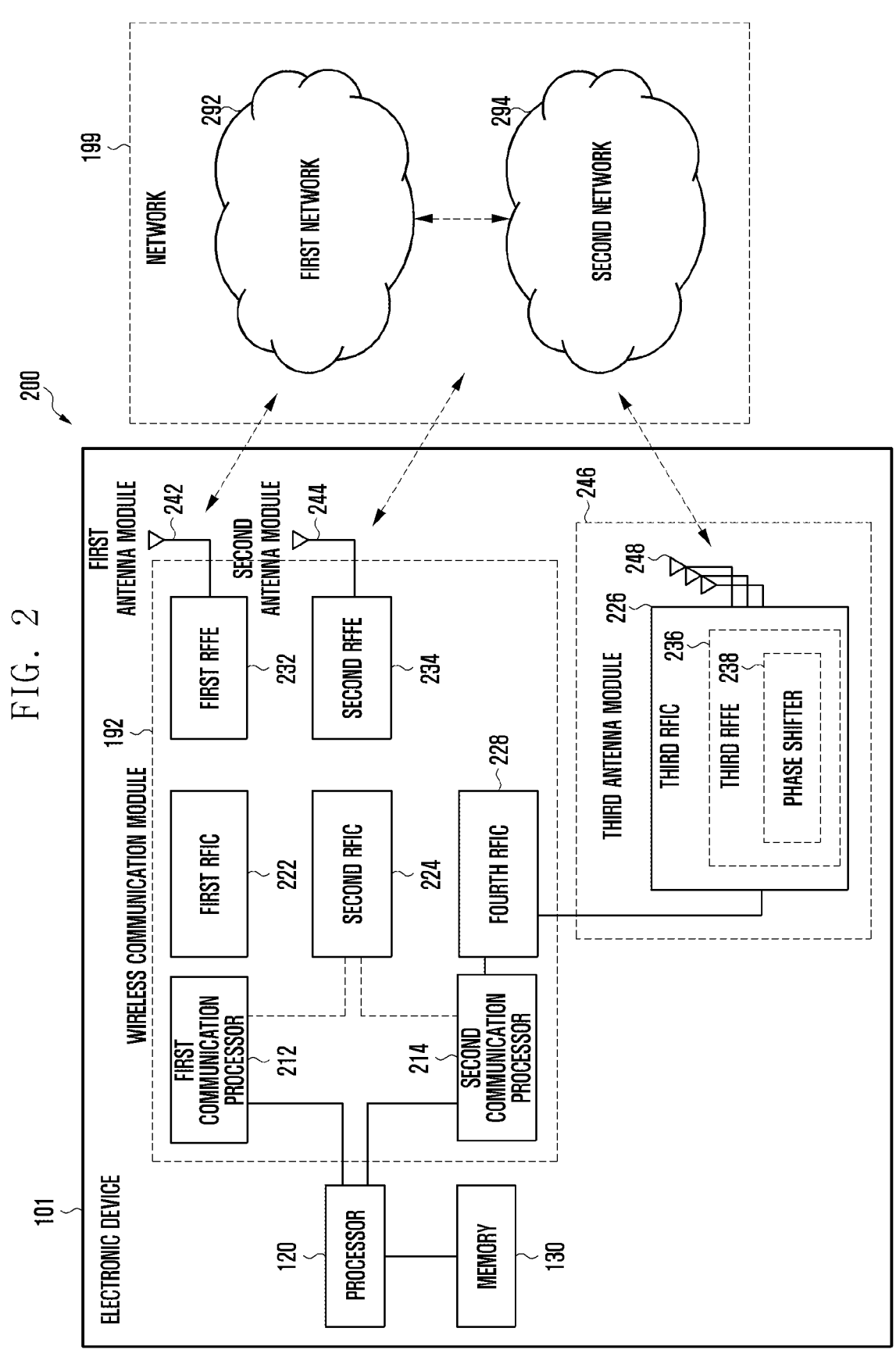
FIG. 2 is a block diagram illustrating an example configuration of an electronic device for supporting legacy network communication and 5G network communication, according to various embodiments.

FIG. 2 is a block diagram 200 illustrating an example configuration of an electronic device 101 supporting legacy network communication and 5G network communication according to various embodiments.

Referring to FIG. 2, according to various embodiments, the electronic device 101 may include a first communication processor (e.g., including processing circuitry) 212, a second communication processor (e.g., including processing circuitry) 214, a first radio frequency integrated circuit (RFIC) 222, a second RFIC 224, a third RFIC 226, a fourth RFIC 228, a first radio frequency front end (RFFE) 232, a second RFFE 234, a first antenna module 242, a second antenna module 244, and an antenna 248. The electronic device 101 may include the processor 120 and the memory 130. The network 199 may include a first network 292 and a second network 294. According to an embodiment, the electronic device 101 may further include at least one component among the components illustrated in FIG. 1, and the network 199 may further include at least one other network. According to an embodiment, the first communication processor 212, the second communication processor 214, the first RFIC 222, the second RFIC 224, the fourth RFIC 228, the first RFFE 232, and the second RFFE, 234 may be at least a part of the wireless communication module 192. According to an embodiment, the fourth RFIC 228 may be omitted, or may be included as a part of the third RFIC 226.

The first communication processor 212 may establish a communication channel of a band to be used for wireless communication with the first network 292, and may support legacy network communication via the established communication channel According to an embodiment, the first network may be a legacy network including second generation (2G), third generation (3G), fourth generation (4G), or long-term evolution (LTE) network. The second communication processor 214 may establish a communication channel corresponding to a designated band (e.g., approximately 6 GHz to 60 GHz) among bands to be used for wireless communication with the second network 294, and may support 5G network communication via the established communication channel According to an embodiment, the second network 294 may be a 5G network (e.g., new radio (NR)) defined in 3GPP. In addition, according to an embodiment, the first communication processor 212 or the second communication processor 214 may establish a communication channel corresponding to another designated band (e.g., approximately 6 GHz or less) among bands to be used for wireless communication with the second network 294, and may support 5G network communication via the established communication channel According to an embodiment, the first communication processor 212 and the second communication processor 214 may be implemented in a single chip or a single package. According to an embodiment, the first communication processor 212 or the second communication processor 214 may be implemented in a single chip or a single package, together with the processor 120, the sub-processor 123, or the communication module 190.

According to an embodiment, the first communication processor 212 may perform data transmission or reception with the second communication processor 214. For example, data which has been classified to be transmitted via the second network 294 may be changed to be transmitted via the first network 292.

In this instance, the first communication processor 212 may receive transmission data from the second communication processor 214. For example, the first communication processor 212 may perform data transmission or reception with the second communication processor 214 via an inter-processor interface. The inter-processor interface may be implemented as, for example, a universal asynchronous receiver/transmitter (UART) (e.g., a high speed-UART (HS-UART)) or a peripheral component interconnect bus express (PCIe), but the type of interface is not limited thereto. For example, the first communication processor 212 and the second communication processor 214 may exchange control information and packet data information using, for example, a shared memory. For example, the first communication processor 212 may perform transmission or reception of various types of information such as sensing information, information associated with an output strength, and resource block (RB) allocation information, with the second communication processor 214.

Depending on implementation, the first communication processor 212 may not be directly connected to the second communication processor 214. In this instance, the first communication processor 212 may perform data transmission or reception with the second communication processor 214, via the processor 120 (e.g., an application processor). For example, the first communication processor 212 and the second communication processor 214 may perform data transmission or reception via the processor 120 (e.g., an application processor) and a HS-UART interface or a PCIe interface, but the type of interface is not limited. For example, the first communication processor 212 and the second communication processor 214 may exchange control information and packet data information using the processor 120 (e.g., an application processor) and a shared memory. According to an embodiment, the first communication processor 212 and the second communication processor 214 may be implemented in a single chip or a single package. According to various embodiments, the first communication processor 212 or the second communication processor 214 may be implemented in a single chip or a single package, together with the processor 120, the sub-processor 123, or the communication module 190.

In the case of transmission, the first RFIC 222 may convert a baseband signal generated by the first communication processor 212 into a radio frequency (RF) signal in the range of approximately 700 MHz to 3 GHz, which is used in the first network 292 (e.g., a legacy network). In the case of reception, an RF signal is obtained from the first network 292 (e.g., a legacy network) via an antenna (e.g., the first antenna module 242), and may be preprocessed via an RFFE (e.g., the first RFFE 232). The first RFIC 222 may convert the preprocessed RF signal into a baseband signal so that the baseband signal is processed by the first communication processor 212.

In the case of transmission, the second RFIC 224 may convert a baseband signal generated by the first communication processor 212 or the second communication processor 214 into an RF signal (hereinafter, a 5G Sub6 RF signal) in an Sub6 band (e.g., approximately 6 GHz or less) used in the second network 294 (e.g., a 5G network). In the case of reception, a 5G Sub6 RF signal may be obtained from the second network 294 (e.g., a 5G network) via an antenna (e.g., the second antenna module 244), and may be preprocessed by an RFFE (e.g., the second RFFE 234). The second RFIC 224 may convert the preprocessed 5G Sub6 RF signal into a baseband signal so that the signal may be processed by a corresponding communication processor among the first communication processor 212 or the second communication processor 214.

The third RFIC 226 may convert a baseband signal generated by the second communication processor 214 into an RF signal (hereinafter, a 5G Above6 RF signal) of a 5G Above6 band (e.g., approximately 6 GHz to 60 GHz) to be used in the second network 294 (e.g., a 5G network). In the case of reception, a 5G Above6 RF signal is obtained from the second network 294 (e.g., a 5G network) via an antenna (e.g., the antenna 248), and may be preprocessed by the third RFFE 236. The third RFIC 226 may convert the preprocessed 5G Above6 RF signal into a baseband signal so that the signal is processed by the second communication processor 214. According to an embodiment, the third RFFE 236 may be implemented as a part of the third RFIC 226.

According to an embodiment, the electronic device 101 may include the fourth RFIC 228, separately from or, as a part of, the third RFIC 226. In this instance, the fourth RFIC 228 may convert a baseband signal produced by the second communication processor 214 into an RF signal (hereinafter, an IF signal) in an intermediate frequency band (e.g., approximately 9 GHz to 11 GHz), and may transfer the IF signal to the third RFIC 226. The third RFIC 226 may convert the IF signal into a 5G Above6 RF signal. In the case of reception, a 5G Above6 RF signal may be received from the second network 294 (e.g., a 5G network) via an antenna (e.g., the antenna 248), and may be converted into an IF signal by the third RFIC 226. The fourth RFIC 228 may convert the IF signal into a baseband signal so that the second communication processor 214 is capable of processing the baseband signal.

According to an embodiment, the first RFIC 222 and the second RFIC 224 may be implemented as at least a part of a single chip or a single package. According to an embodiment, the first RFFE 232 and the second RFFE 234 may be implemented as at least a part of a single chip or single package. According to an embodiment, at least one of the first antenna module 242 or the second antenna module 244 may be omitted or may be combined with another antenna module, to process RF signals of a plurality of corresponding bands.

According to an embodiment, the third RFIC 226 and the antenna 248 may be disposed in the same substrate, and may form a third antenna module 246. For example, the wireless communication module 192 or the processor 120 may be disposed in a first substrate (e.g., a main PCB). In this instance, the third RFIC 226 is disposed in apart (e.g., a lower part) of a second substrate (e.g., a sub PCB) different from the first substrate, and the antenna 248 is disposed in another part (e.g., an upper part), so that the third antenna module 246 may be formed. By disposing the third RFIC 226 and the antenna 248 in the same substrate, the length of a transmission line therebetween may be reduced. For example, this may reduce a loss (e.g., a diminution) of a high-frequency band signal (e.g., approximately 6 GHz to 60 GHz) used for 5G network communication, the loss being caused by a transmission line. Accordingly, the electronic device 101 may improve the quality or speed of communication with the second network 294 (e.g., a 5G network).

According to an embodiment, the antenna 248 may be implemented as an antenna array including a plurality of antenna elements which may be used for beamforming. In this instance, the third RFIC 226, for example, may include a plurality of phase shifters 238 corresponding to a plurality of antenna elements, as a part of the third RFFE 236. In the case of transmission, each of the plurality of phase shifters 238 may shift the phase of a 5G Above6RF signal to be transmitted to the outside of the electronic device 101 (e.g., a base station of a 5G network) via a corresponding antenna element. In the case of reception, each of the plurality of phase shifters 238 may shift the phase of a 5G Above6 RF signal received from the outside via a corresponding antenna element into the same or substantially the same phase. This may enable transmission or reception via beamforming between the electronic device 101 and the outside.

The second network 294 (e.g., a 5G network) may operate independently (e.g., Standalone (SA)) from the first network 292 (e.g., a legacy network), or may operate by being connected thereto (e.g., Non-Standalone (NSA)). For example, in the 5G network, only an access network (e.g., 5G radio access network (RAN) or next generation RAN (NG RAN)) may exist, and a core network (e.g., next generation core (NGC)) may not exist. In this instance, the electronic device 101 may access the access network of the 5G network, and may access an external network (e.g., the Internet) under the control of the core network (e.g., an evolved packed core (EPC)) of the legacy network. Protocol information (e.g., LTE protocol information) for communication with the legacy network or protocol information (e.g., new radio (NR) protocol information) for communication with the 5G network may be stored in the memory 130, and may be accessed by another component (e.g., the processor 120, the first communication processor 212, or the second communication processor 214).

Figure 3:
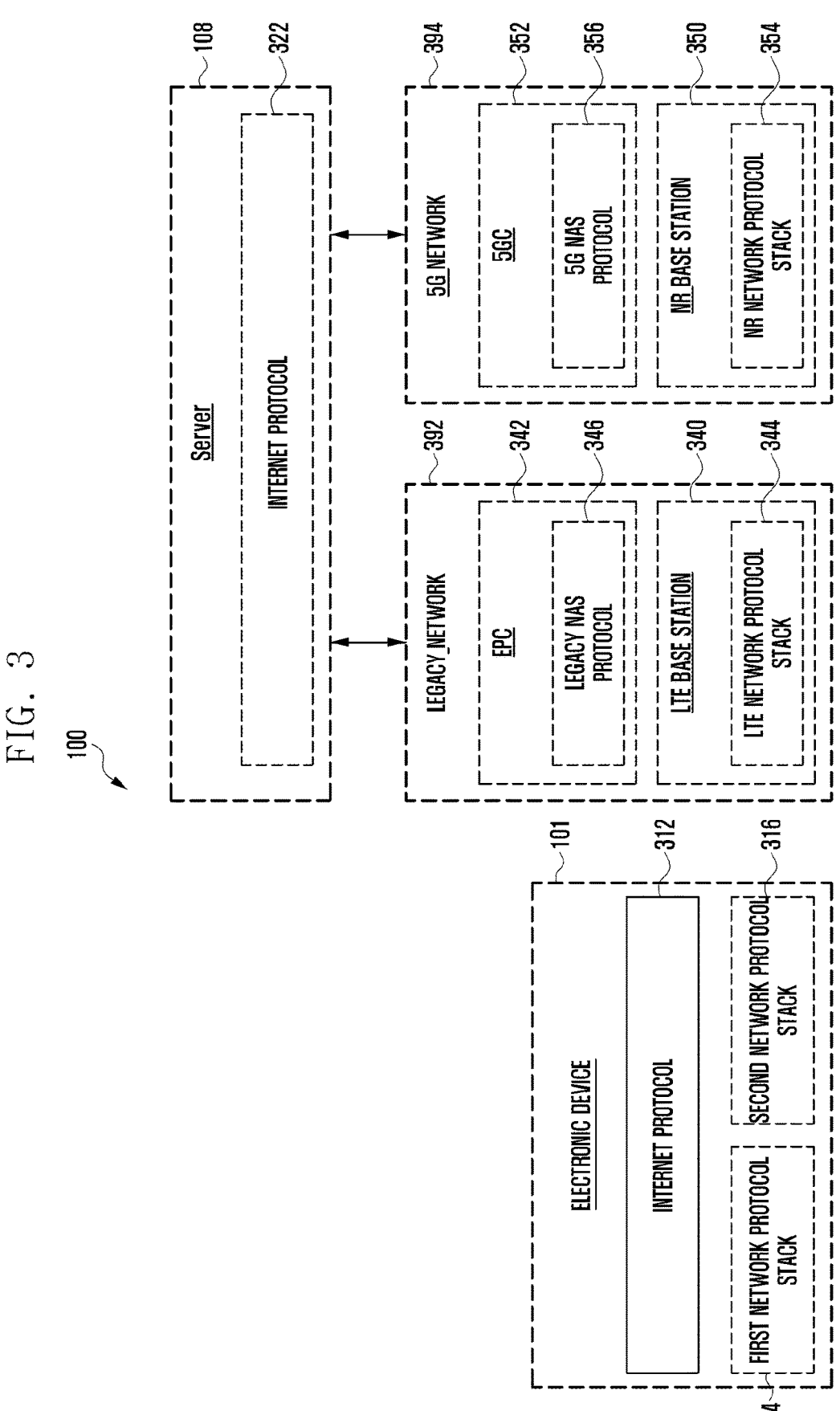
FIG. 3 is a diagram illustrating an example protocol stack structure of a network 100 of 4G communication and/or 5G communication, according to various embodiments.

FIG. 3 is a diagram illustrating a protocol stack structure of a network 100 of 4G communication and/or 5G communication according to various embodiments.

Referring to FIG. 3, the network 100 according to various embodiments may include the electronic device 101, a 4G network 392, a 5G network 394, and the server 108.

According to various embodiments, the electronic device 101 may include an Internet protocol 312, a first communication protocol stack 314, and a second communication protocol stack 316. For example, the electronic device 101 may communicate with the server 108 via the 4G network 392 and/or 5G network 394.

According to an embodiment, the electronic device 101 may perform Internet communication associated with the server 108 using the Internet protocol 312 (e.g., a transmission control protocol (TCP), a user datagram protocol (UDP), or an internet protocol (IP)). For example, the Internet protocol 312 may be performed in a main processor (e.g., the main processor 121 of FIG. 1) included in the electronic device 101.

According to an embodiment, the electronic device 101 may perform wireless communication with the 4G network 392 using the first communication protocol stack 314. According to an embodiment, the electronic device 101 may perform wireless communication with the 5G network 394 using the second communication protocol stack 316. For example, the first communication protocol stack 314 and the second communication protocol stack 316 may be performed by one or more communication processors (e.g., the wireless communication module 192 of FIG. 1) included in the electronic device 101.

According to various embodiments, the server 108 may include the Internet protocol 322. The server 108 may perform transmission or reception of data related to the Internet protocol 322 with the electronic device 101 via the 4G network 392 and/or 5G network 394. According to an embodiment, the server 108 may include a cloud computing server existing outside the 4G network 392 or the 5G network 394. According to an embodiment, the server 108 may include an edge computing server (or a mobile edge computing (MEC) server) located inside at least one of the 4G network 392 or the 5G network 394.

According to various embodiments, the 4G network 392 may include a long-term evolution (LTE) base station 340 and an evolved packet core (EPC) 342. The LTE base station 340 may include an LTE communication protocol stack 344. The EPC 342 may include a legacy non-access stratum (NAS) protocol 346. The 4G network 392 may perform LTE wireless communication with the electronic device 101 using the LTE communication protocol stack 344 and the legacy NAS protocol 346.

According to various embodiment, the 5G network 394 may include a new radio (NR) base station 350 and a 5th generation core (5GC) 352. The NR base station 350 may include an NR communication protocol stack 354. The 5GC 352 may include a 5G NAS protocol 356. The 5G network 394 may perform NR wireless communication with the electronic device 101 using the NR communication protocol stack 354 and the 5G NAS protocol 356.

According to an embodiment, the first communication protocol stack 314, the second communication protocol stack 316, the LTE communication protocol stack 344, and the NR communication protocol stack 354 may include a control plane protocol for transmitting or receiving a control message and a user plane protocol for transmitting or receiving user data. For example, the control message may include a message related to at least one of security control, bearer setup, authentication, registration, or mobility management. For example, the user data may include, for example, the remaining data, excluding the control message.

According to an embodiment, the control plane protocol and the user plane protocol may include a physical (PHY) layer, a medium access control (MAC) layer, a radio link control (RLC) layer, or a packet data convergence protocol (PDCP) layer. For example, the PHY layer may perform channel coding and modulation of data received from a higher layer (e.g., the MAC layer), and transmit the same to a wireless channel, and may perform demodulation and decoding of data received via a wireless channel and transmit the same to a higher layer. The PHY layer included in the second communication protocol stack 316 and the NR communication protocol stack 354 may further perform an operation related to beamforming. For example, the MAC layer may logically/physically map data to a wireless channel to be transmitted or received, and may perform hybrid automatic repeat request (HARQ) for error correction. For example, the RLC layer may perform concatenation, segmentation, or reassembly of data, may identify the order of data, may perform reordering, and may perform redundancy check. For example, the PDCP layer may perform an operation of ciphering control data and user data, and an operation related to data integrity. The second communication protocol stack 316 and the NR communication protocol stack 354 may further include a service data adaptation protocol (SDAP). For example, the SDAP may manage wireless bearer allocation based on the quality of service (QoS) of user data.

According to various embodiments, the control plane protocol may include a radio resource control (RRC) layer and a non-access stratum (NAS) layer. For example, the RRC layer may process control data related to radio bearer setup, paging, or mobility management. For example, the NAS may process a control message related to authentication, registration, and mobility management.

According to various embodiments, the electronic device 101 may include a plurality of subscriber identification modules (eg, a first subscriber identification module and a second subscriber identification module), and subscriber information stored in each subscriber identification module (eg, an international mobile subscriber identifier) (IMSI)) may be used to communicate with the 4G network 392 and/or the 5G network 394.

According to various embodiments, the electronic device 101 may further include a third communication protocol stack (not shown) and a fourth communication protocol stack (not shown). Here, the third communication protocol stack corresponds to the first communication protocol stack 314, and may include various protocols for wireless communication with the 4G network 392, and the fourth communication protocol stack is corresponds to the second communication protocol stack 316 or may include various protocols for wireless communication with the 5G network 394. According to various embodiments, when communicating using the first subscriber identification module, the electronic device 101 wirelessly communicates with the 4G network 392 using the first communication protocol stack 314 and 5G network 394 using the second communication protocol stack 316. In addition, when communicating using the second subscriber identification module, the electronic device wirelessly communicates with the 4G network 392 using the third communication protocol stack or the 5G network using the fourth communication protocol stack.

Figure 4:
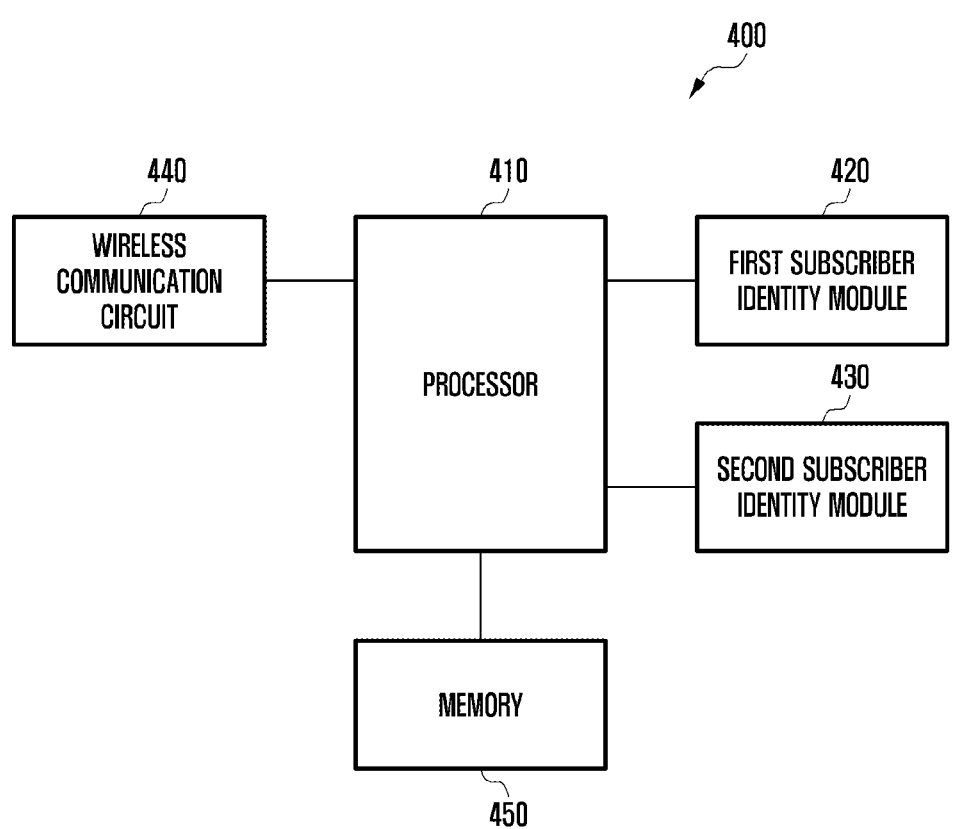
FIG. 4 is a block diagram illustrating an example configuration of an electronic device supporting a plurality of subscriber identity modules, according to various embodiments.

FIG. 4 is a block diagram illustrating an example configuration of an electronic device supporting a plurality of subscriber identity modules, according to various embodiments. According to an embodiment, the electronic device 400 of FIG. 4 may be at least partially similar to the electronic device 101 of FIG. 1, 2, or 3, or may further include various embodiments of the electronic device.

Referring to FIG. 4, according to various embodiments, the electronic device 400 may include a processor (e.g., including processing circuitry) 410, a first subscriber identity module (SIM) 420, a second subscriber identity module 430, a wireless communication circuit 440, and/or a memory 450. According to an embodiment, the processor 410 may be substantially the same as the processor 120 of FIG. 1 or included in the processor 120. The first subscriber identity module 420 and the second subscriber identity module 430 may be substantially the same as the subscriber identity module 196 of FIG. 1 or included in the subscriber identity module 196. The wireless communication circuit 440 may be substantially the same as the wireless communication module 192 of FIG. 1 or included in the wireless communication module 192. The memory 450 may be substantially the same as the memory 130 of FIG. 1 or included in the memory 130.

According to various embodiments, the electronic device 400 includes the first subscriber identity module 420 and the second subscriber identity module 430, but is not limited thereto.

According to various embodiments, the processor 410 may include various processing circuitry and control the first subscriber identity module 420, the second subscriber identity module 430, the wireless communication circuit 440, and/or the memory 450 that are operatively connected thereto. According to an embodiment, the processor 410 may include an application processor (AP) (e.g., the main processor 121 of FIG. 1) and/or a communication processor (CP) (e.g., the auxiliary processor 123 of FIG. 1 or the communication module 190 of FIG. 1). According to an embodiment, the communication processor may include a first processing part and a second processing part. For example, the first processing part may communicate with a first node (e.g., a base station or a transmission node) of a first wireless network. As an example, the first processing part may transmit and/or receive control messages and/or data with the first node via the first wireless network. For example, the second processing part may perform wireless communication with a second node (e.g., a base station or a transmission node) of a second wireless network. As an example, the second processing part may transmit and/or receive control messages and/or data with the second node via the second wireless network. For example, the first processing part and the second processing part may include software that processes signals and protocols of different frequency bands. For example, the first processing part and the second processing part may include different circuits or different hardware. For example, the first processing part and the second processing part may be logically (e.g., software) separated parts.

According to various embodiments, the subscriber identity modules 420 and 430 may store identity information (e.g., international mobile subscriber identity (IMSI)) for access, authentication, billing, and/or security in a wireless network. According to an embodiment, the first subscriber identity module 420 may store identity information for use by the electronic device 400 to access the first wireless network. As an example, the first wireless network may represent a wireless network to which the electronic device 400 is connected based on the first subscriber identity information stored in the first subscriber identity module 420. According to an embodiment, the second subscriber identity module 430 may store identity information for use by the electronic device 400 to access the second wireless network. As an example, the second wireless network may represent a wireless network to which the electronic device 400 is connected based on the second subscriber identity information stored in the second subscriber identity module 430.

According to various embodiments, the subscriber identity module 420 and/or 430 may be configured in the form of an integrated circuit (IC) card and mounted in a slot of the electronic device 400. According to an embodiment, at least one of the subscriber identity modules 420 and/or 430 may be configured in the form of an embedded SIM (eSIM) (or embedded universal integrated circuit card (eUICC)) directly embedded in the electronic device 400. For example, when the subscriber identity module 420 and/or 430 is configured in the form of an eSIM, the electronic device 400 may store information related to the subscriber identity module 520 and/or 530 via remote SIM provisioning in a security chip disposed on a circuit board of the electronic device 400 during a manufacturing process of the electronic device 400.

According to various embodiments, the processor 410 may control the wireless communication circuit 440 to communicate with a wireless network based on subscriber identity information stored in the subscriber identity module 420 and/or 430. According to an embodiment, the processor 410 may control the wireless communication circuit 440 to communicate with the first wireless network based on the first subscriber identity information stored in the first subscriber identity module 420 via a first communication protocol stack. As an example, the first communication protocol stack is a communication function supporting wireless communication related to the first subscriber identity module 420 and may be executed by the processor 410 (e.g., a CP) for communication with the first wireless network. According to an embodiment, the processor 410 may control the wireless communication circuit 440 to communicate with the second wireless network based on the second subscriber identity information stored in the second subscriber identity module 430 via a second communication protocol stack. As an example, the second communication protocol stack is a communication function supporting wireless communication related to the second subscriber identity module 430 and may be executed by the processor 410 (e.g., a CP) for communication with the second wireless network.

According to various embodiments, the processor 410 may independently control the electronic device to use or share the radio resources of the wireless communication circuit 440 for communication with the first wireless network and the radio resources of the wireless communication circuit 440 for communication with the second wireless network. As an example, the radio resource may include a transmission radio path and/or a reception radio path. According to an embodiment, the first communication protocol stack and the second communication protocol stack of the processor 410 may independently use radio resources (e.g., a transmission radio path and/or a reception radio path) of the wireless communication circuit 440, based on the frequency band used for communication with the first wireless network and the second wireless network. According to an embodiment, the first communication protocol stack and the second communication protocol stack of the processor 410 may share radio resources (e.g., a transmission radio path and/or a reception radio path) of the wireless communication circuit 440, based on the frequency band used for communication with the first wireless network and the second wireless network. According to an embodiment, the first communication protocol stack and the second communication protocol stack of the processor 410 may share transmission radio resources (e.g., a transmission radio path) of the wireless communication circuit 440, and independently use reception radio resources (e.g., a reception radio path) based on the frequency band used for communication with the first wireless network and the second wireless network. As an example, radio resources for communication with the first wireless network may include a transmission radio path and/or a reception radio path of the wireless communication circuit 440 used to communicate with the first wireless network based on the first subscriber identity information stored in the first subscriber identity module 420 in the first communication protocol stack. As an example, radio resources for communication with the second wireless network may include a transmission radio path and/or a reception radio path of the wireless communication circuit 440 used to communicate with the second wireless network based on the second subscriber identity information stored in the second subscriber identity module 430 in the second communication protocol stack.

According to various embodiments, when the first communication protocol stack and the second communication protocol stack share radio resources (e.g., a transmission radio path and/or a reception radio path) of the wireless communication circuit 440, the processor 410 may allocate the radio resources to wireless communication with the first wireless network and/or wireless communication with the second wireless network. According to an embodiment, when the first communication protocol stack corresponding to the first subscriber identity module 420 requests the use of the radio resources (e.g., a transmission radio path and/or a reception radio path), the processor 410 may allocate the radio resources of the wireless communication circuit 440 to wireless communication with the first wireless network based on the first subscriber identity module 420. For example, when not performing wireless communication with the second wireless network based on the second subscriber identity module 430, the processor 410 may allocate the radio resources of the wireless communication circuit 440 to wireless communication with the first wireless network based on the first subscriber identity module 420.

According to an embodiment, when the second communication protocol stack requests radio resources of the wireless communication circuit 440 during wireless communication with the first wireless network, the processor 410 may determine whether the radio resources are allocated to the second communication protocol stack. For example, the processor 410 may identify allocation priorities of the radio resources of the first communication protocol stack and the second communication protocol stack based on the cause of requesting radio resources of the first communication protocol stack and the second communication protocol stack. For example, when the first communication protocol stack has a higher radio resource allocation priority than the second communication protocol stack, the processor 410 may determine that the radio resource allocation to the second communication protocol stack is limited. In this case, the first communication protocol stack of the processor 410 may continuously use the radio resources of the wireless communication circuit 440. As another example, when the second communication protocol stack has a higher radio resource allocation priority than the first communication protocol stack, the processor 410 may determine that the radio resources are allocated to the second communication protocol stack. As an example, radio resource allocation to the second communication protocol stack may include a series of operations for allocating radio resources to communication with the second wireless network performed through the second communication protocol stack.

According to an embodiment, when it is determined that that radio resources are allocated to the second communication protocol stack, the wireless communication circuit may allocate all or part of the radio resources of the wireless communication circuit 440 to the second communication protocol stack based on the cause of requesting radio resources of the first communication protocol stack and the second communication protocol stack. For example, when transmission radio resources (e.g., a transmission RF path) are not used for communication with the second wireless network, and a control signal using a reference signal (e.g., a sounding reference signal (SRS)) and/or a physical uplink control channel (PUCCH) is transmitted via communication with the first wireless network, the processor 410 may allocate transmission radio resources (e.g., a transmission RF path) to the first communication protocol stack and reception radio resources (e.g., a reception RF path) to the second communication protocol stack. As another example, when transmission radio resources (e.g., a transmission RF path) are used for communication with the second wireless network, or a control signal using a reference signal (e.g., an SRS) and/or a PUCCH is not transmitted via communication with the first wireless network, the processor 410 may allocate transmission radio resources (e.g., a transmission RF path) and reception radio resources (e.g., a reception RF path) to the second communication protocol stack.

According to various embodiments, when transmission radio resources (e.g., a transmission RF path) are allocated to the first communication protocol stack and reception radio resources (e.g., a reception RF path) are allocated to the second communication protocol stack, a part of a transmission function of the first communication protocol stack of the processor 410 may be limited. According to an embodiment, the first communication protocol stack of the processor 410 may be allowed to transmit a reference signal and/or a control signal that does not require feedback from an external device. According to an embodiment, the first communication protocol stack of the processor 410 may be limited to transmit data via a physical uplink shared channel (PUSCH) requiring feedback via radio resources (e.g., a transmission RF path), and to transmit a RACH preamble via a physical random access channel (PRACH).

According to various embodiments, the wireless communication circuit 440 may receive a signal from an external device or transmit a signal to the outside through an antenna (not illustrated). According to an embodiment, the wireless communication circuit 440 may include an RFIC (e.g., the first RFIC 222 of FIG. 2) and an RFFE (e.g., the first RFFE 232 of FIG. 2) for communication with an external device.

According to various embodiments, the memory 450 may store various data used by at least one component (e.g., the processor 410 or the wireless communication circuit 440) of the electronic device 400. For example, the data may include reference information for determining priorities of the first subscriber identity module 420 and the second subscriber identity module 430. According to an embodiment, the memory 450 may store various instructions that may be executed by the processor 410.

According to various embodiments, an electronic device (e.g., the electronic device 101 of FIG. 1, 2, or 3 or the electronic device 400 of FIG. 4) may include: a first subscriber identity module (e.g., the subscriber identity module 196 of FIG. 1 or the first subscriber identity module 420 of FIG. 4) storing first subscriber identity information, a second subscriber identity module (e.g., the subscriber identity module 196 of FIG. 1 or the second subscriber identity module 430 of FIG. 4) storing second subscriber identity information, a wireless communication circuit (e.g., the wireless communication module 192 of FIG. 1 or the wireless communication circuit 440 of FIG. 4) including transmission radio resources and reception radio resources shared for communication with a first wireless network based on the first subscriber identity information and communication with a second wireless network based on the second subscriber identity information, and a processor (e.g., the processor 120 of FIG. 1 or the processor 410 of FIG. 4) operatively connected to the first subscriber identity module, the second subscriber identity module, and the wireless communication circuit, wherein the processor may be configured to: control the wireless communication circuit to communicate with the first wireless network based on the first subscriber identity information through the wireless communication circuit, identify priority of communication with the first wireless network and communication with the second wireless network based on it being necessary to use the wireless communication circuit to communicate with the second wireless network based on the second subscriber identity information, identify information related to the request for use of the wireless communication circuit from communication with the first wireless network and communication with the second wireless network based on communication with the second wireless network having a higher priority than communication with the first wireless network, allocate the transmission radio resource to communication with the first wireless network and allocate the reception radio resource to communication with the second wireless network based on determining that the transmission radio resource is not used in communication with the second wireless network based on the information related to the request for use of the wireless communication circuit, and in communication with the first wireless network, a reference signal and/or a control signal that does not require feedback from an external device through the transmission radio resource may be transmitted based on the reception radio resource being allocated to communication with the second wireless network while the transmission radio resource is allocated to communication with the first wireless network.

According to various example embodiments, the processor may be configured to: identify a first frequency band used for communication with the first wireless network and a second frequency band used for communication with the second wireless network and determine that communication with the first wireless network and communication with the second wireless network share the radio resource of the wireless communication circuit based on the first frequency band and the second frequency band satisfying specified conditions.

According to various example embodiments, the priority of communication with the first wireless network and communication with the second wireless network may be configured based on a purpose for requesting use of the wireless communication circuit from communication with the first wireless network and communication with the second wireless network.

According to various example embodiments, the processor may be configured to: control the wireless communication circuit to transmit a reference signal and/or a control signal through communication with the first wireless network, and determine that communication with second wireless network does not use the transmission radio resource based on determining that communication with the second wireless network does not use the transmission radio resource.

According to various example embodiments, the processor may be configured to: determine that communication with the second wireless network does not use the transmission radio resource based on determining that a paging monitoring, a system information acquisition, a multimedia broadcast multicast service (MBMS), a cell selection, a cell reselection, intra-frequency search and measurement, inter-frequency search and measurement, inter-RAT (inter-Radio Access Technology) search and measurement, or a link monitoring through communication with the second wireless network.

According to various example embodiments, the reference signal may include a sounding reference signal (SRS), and the control signal may include a signal transmitted to an external device using a physical uplink control channel (PUCCH).

According to various example embodiments, the processor may be configured to: allocate the transmission radio resource and the reception radio resource of the wireless communication circuit to communication with the second wireless network based on transmitting data through communication with the first wireless network.

According to various example embodiments, the processor may be configured to: allocate the transmission radio resource and the reception radio resource of the wireless communication circuit to communication with the second wireless network based on determining that the transmission radio resource is used in communication with the second wireless network.

According to various example embodiments, communication with the first wireless network may limit transmission of data and random access channel preamble through the transmission radio resource of the wireless communication circuit based on the reception radio resource being allocated to communication with the second wireless network while the transmission radio resource is allocated to communication with the first wireless network.

According to various example embodiments, the processor may be configured to: limit allocation of radio resources to communication with the second wireless network based on the priority of communication with the first wireless network being higher than the priority of communication with the second wireless network.

Figure 5:
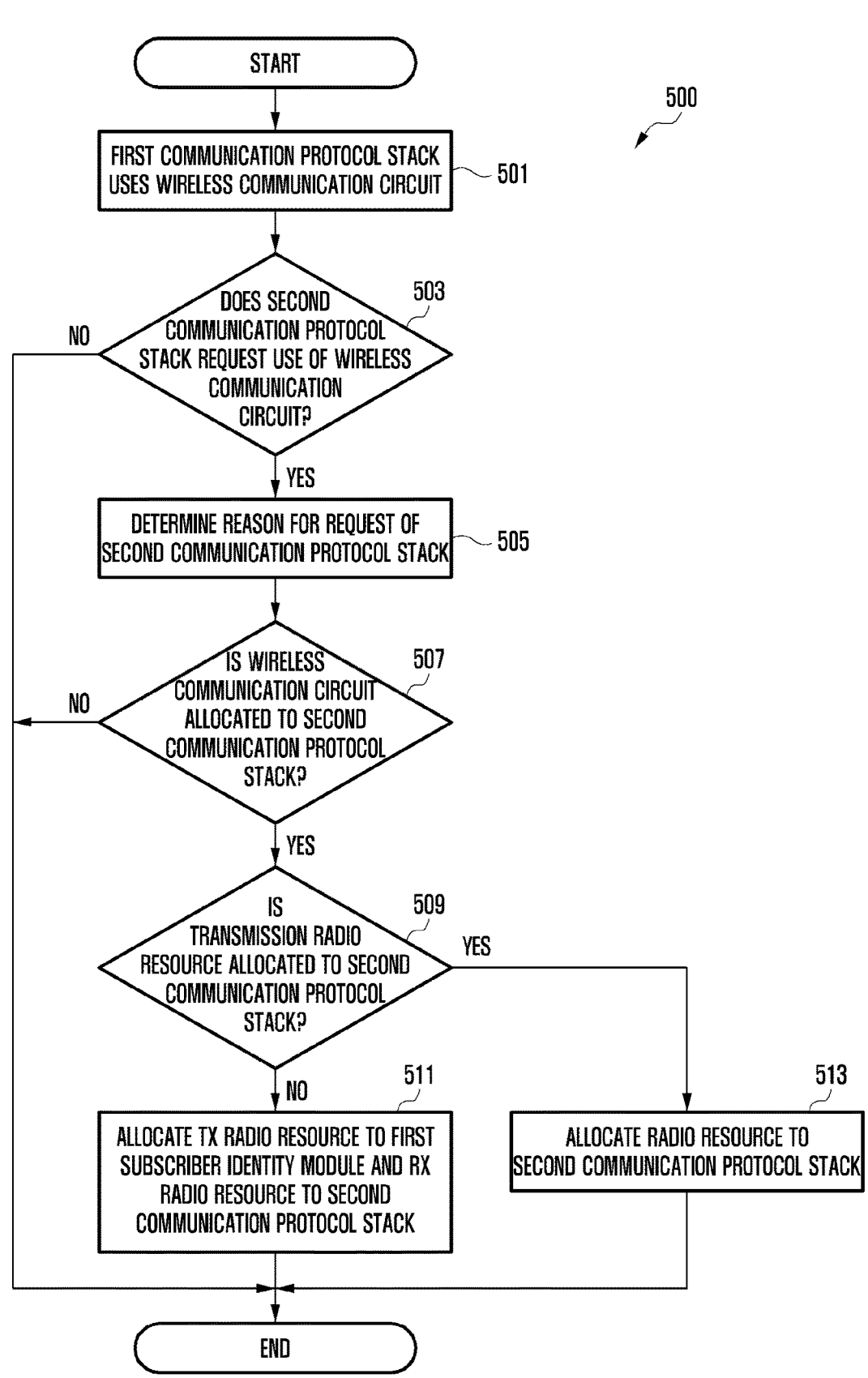
FIG. 5 is a flowchart illustrating an example process for allocating radio resources in an electronic device, according to various embodiments.
Figure 6:
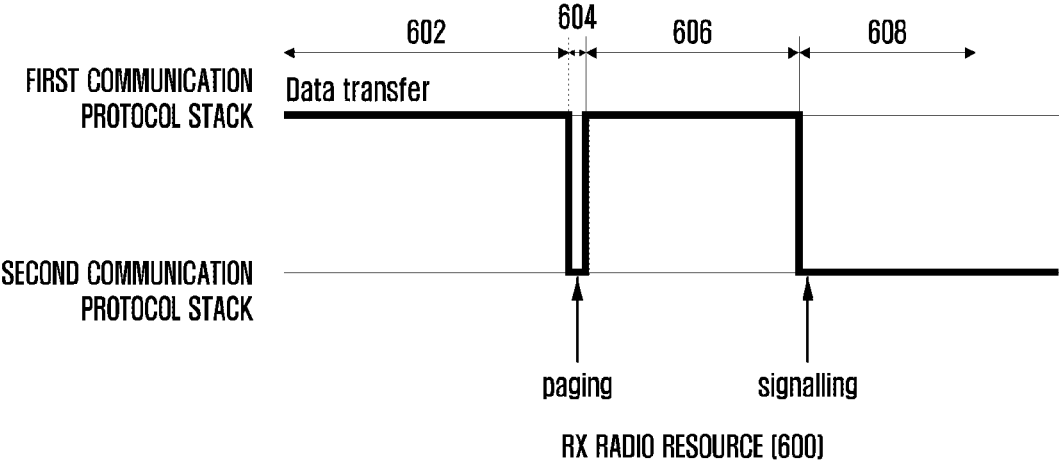
FIG. 6 is a graph illustrating an example for allocating radio resources in an electronic device, according to various embodiments.
Figure 6:
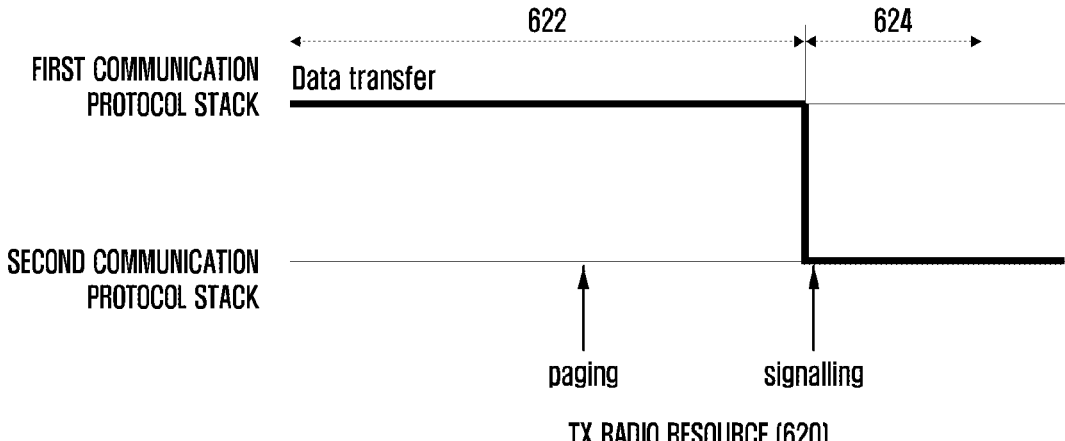

FIG. 5 is a flowchart 500 illustrating an example process for allocating radio resources in an electronic device, according to various embodiments. Operations in the following embodiments may be performed sequentially, but are not necessarily performed sequentially. For example, the order of operations may be changed, or at least two operations may be performed in parallel. As an example, the electronic device of FIG. 5 may be the electronic device 101 of FIG. 1, 2, or 3 or the electronic device 400 of FIG. 4. As an example, at least some components of FIG. 5 will be described with reference to FIG. 6. FIG. 6 includes graphs illustrating an example for allocating radio resources in an electronic device according to various embodiments.

Referring to FIG. 5, according to various embodiments, in operation 501, an electronic device (e.g., the processor 120 of FIG. 1 or the processor 410 of FIG. 4) may perform wireless communication using radio resources (e.g., a transmission radio path and/or a reception radio path) of the wireless communication circuit (e.g., the wireless communication circuit 440 of FIG. 4) by the first communication protocol stack corresponding to the first subscriber identity module (e.g., the first subscriber identity module 420 of FIG. 4). According to an embodiment, when the first communication protocol stack corresponding to the first subscriber identity module 420 requests the use of radio resources (e.g., a transmission radio path and/or a reception radio path) of the wireless communication circuit 440, the processor 410 may identify whether the second communication protocol stack corresponding to the second subscriber identity module 430 is using radio resources of the wireless communication circuit 440. When the second communication protocol stack is not using the radio resources of the wireless communication circuit 440, the processor 410 may allocate radio resources of the wireless communication circuit 440 to the first communication protocol stack. For example, the first communication protocol stack of the processor 410 may communicate with the first wireless network through the radio resources of the wireless communication circuit 440. For example, the first communication protocol stack of the processor 410 may control the wireless communication circuit 440 to communicate with the first wireless network based on the first subscriber identity information stored in the first subscriber identity module 420. As an example, the communication protocol stack corresponding to the first subscriber identity module 420 (or the first communication protocol stack 314 of FIG. 3) may transmit and/or receive signals (or data) through the first wireless network using the reception radio resource (e.g., a reception RF path) 600 and the transmission radio resource (e.g., a transmission RF path) 620 during the first period 602 of FIG. 6. As an example, radio resource allocation to the first communication protocol stack may include a series of operations for allocating radio resources to communication with the first wireless network performed through the first communication protocol stack.

According to various embodiments, in operation 503, the electronic device (e.g., the processor 120 or 410) may identify whether the second communication protocol stack corresponding to the second subscriber identity module (e.g., the second subscriber identity module 430 of FIG. 4) requests the use of radio resources (e.g., a transmission radio path and/or a reception radio path) of the wireless communication circuit (e.g., the wireless communication circuit 440 of FIG. 4).

According to various embodiments, in operation 505, when the second communication protocol stack requests the use of a radio resource (e.g., a transmission radio path and/or a reception radio path) of the wireless communication circuit (e.g., the wireless communication circuit 440 of FIG. 4) (e.g., 'Yes' in operation 503), the electronic device (e.g., the processor 120 or 410) may identify the request cause (e.g., reason) for the radio resource of the second communication protocol stack. For example, the request cause may include information related to at least one of a purpose of use of the radio resource, a use time point, and a use period by the second communication protocol stack. As an example, the purpose of using radio resources may include signaling for transmitting and receiving a control signal with an external device, measurement for identifying a wireless state with the external device, or paging monitoring. As an example, the signaling may include radio resource control (RRC) signaling. As an example, the measurement may include intra-frequency search and measurement, inter-frequency search and measurement, inter-RAT search and measurement, or link monitoring.

According to various embodiments, in operation 507, the electronic device (e.g., the processor 120 or 410) may identify whether radio resources (e.g., a transmission radio path and/or a reception radio path) of the wireless communication circuit (e.g., the wireless communication circuit 440 of FIG. 4) may be allocated to the second communication protocol stack based on the request cause for the radio resources of the second communication protocol stack. According to an embodiment, when the second communication protocol stack requests radio resources of the wireless communication circuit 440 while the first communication protocol stack is using the radio resources of the wireless communication circuit 440, the processor 410 may identify allocation priorities of the radio resources of the first communication protocol stack and the second communication protocol stack. For example, when the first communication protocol stack has a higher radio resource allocation priority than the second communication protocol stack, the processor 410 may determine that the radio resource allocation to the second communication protocol stack is limited. For another example, when the second communication protocol stack has a higher radio resource allocation priority than the first communication protocol stack, the processor 410 may determine that the radio resource is allocated to the second communication protocol stack. As an example, the radio resource allocation priority may be configured based on the cause for requesting radio resources by the first communication protocol stack and the second communication protocol stack.

According to various embodiments, when the second communication protocol stack does not request the use of radio resources (e.g., a transmission radio path and/or a reception radio path) of the wireless communication circuit (e.g., the wireless communication circuit 440 of FIG. 4) (e.g., 'No' in operation 503) or when it is determined that the radio resources of the wireless communication circuit are not allocated to the second communication protocol stack (e.g., 'No' in operation 507), the electronic device (e.g., the processor 120 or 410) may terminate allocating radio resources. According to an embodiment, when the second communication protocol stack does not request the use of radio resources (e.g., a transmission radio path and/or a reception radio path) of the wireless communication circuit 440, the processor 410 may control the wireless communication circuit 440 to transmit and/or receive signals (or data) through the first wireless network related to the first communication protocol stack.

According to various embodiments, when it is determined that the radio resources of the wireless communication circuit are allocated to the second communication protocol stack (e.g., 'Yes' in operation 507), in operation 509, the electronic device (e.g., the processor 120 or 410) may determine whether to allocate the transmission radio resource (e.g., a transmission RF path) to the second communication protocol stack for a specified period of time. According to an embodiment, when communication with the second wireless network by the second communication protocol stack does not use the transmission radio resource (e.g., a transmission RF path), and communication with the first wireless network by the first communication protocol stack transmits a reference signal (e.g., a sounding reference signal (SRS)) and/or a control signal using a physical uplink control channel (PUCCH) through the transmission radio resource, the processor 410 may determine that the transmission radio resource (e.g., a transmission RF path) is not allocated to the second communication protocol stack. According to an embodiment, when it is determined that communication with the second wireless network by the second communication protocol stack uses the transmission radio resource (e.g., a transmission RF path), or communication with the first wireless network by the first communication protocol stack does not transmit a reference signal (e.g., a SRS) and/or a control signal using a PUCCH through the transmission radio resource, the processor 410 may determine that the transmission radio resource (e.g., a transmission RF path) is allocated to the second communication protocol stack.

According to various embodiments, when it is determined that the transmission radio resource (e.g., a transmission RF path) is not allocated to the second communication protocol stack (e.g., 'No' in operation 509), in operation 511, the electronic device (e.g., the processor 120 or 410) may allocate the transmission radio resource (e.g., a transmission RF path) to the first communication protocol stack and the reception radio resource (e.g., a reception RF path) to the second communication protocol stack. According to an embodiment, as illustrated in the second period 604 of FIG. 6, the processor 410 may allocate the reception radio resource 600 to the second communication protocol stack, and control the wireless communication circuit 440 to maintain the allocation of the first communication protocol stack to the transmission radio resource 620.

According to an embodiment, the first communication protocol stack of the processor 410 may be limited in some transmission functions for the transmission radio resource (e.g., a transmission RF path) when the transmission radio resource (e.g., a transmission RF path) is allocated to the first communication protocol stack and the reception radio resource (e.g., a reception RF path) is allocated to the second communication protocol stack. For example, the first communication protocol stack may be limited in data transmission through a physical uplink shared channel (PUSCH) requiring feedback through the transmission radio resource (e.g., a transmission RF path) and transmission of a RACH preamble through a physical random access channel (PRACH). For example, the first communication protocol stack may transmit a control signal (e.g., a demodulation reference signal (DRMS)) using a sounding reference signal (SRS) or a physical uplink control channel (PUCCH) that does not require feedback through the transmission radio resource (e.g., a transmission RF path).

According to an embodiment, when the reception radio resource (e.g., a reception RF path) is allocated, the second communication protocol stack of the processor 410 may control the wireless communication circuit 440 to perform communication (e.g., paging monitoring) through the reception radio resource (e.g., a reception RF path).

According to various embodiments, when it is determined that the transmission radio resource (e.g., a transmission RF path) is allocated to the second communication protocol stack (e.g., 'Yes' in operation 509), in operation 513, the electronic device (e.g., the processor 120 or 410) may allocate radio resources (e.g., a transmission RF path and a reception RF path) of the wireless communication circuit (e.g., the wireless communication circuit 440 of FIG. 4) to the second communication protocol stack. According to an embodiment, the processor 410 may allocate the reception radio resource 600 and the transmission radio resource 620 to the second communication protocol stack, as illustrated in the fourth section 608 of FIG. 6.

According to various embodiments, when the first communication protocol stack and the second communication protocol stack share radio resources of the wireless communication circuit 440, the electronic device 400 may allocate radio resources to the first communication protocol stack and/or the second communication protocol stack. According to an embodiment, the reception radio resource

600 of the wireless communication circuit 440 may be allocated to the first communication protocol stack during the first period 602 and the third period 606 based on the request of the first communication protocol stack, and may be allocated to the second communication protocol stack during the second period 604 and the fourth period 608 based on the request of the second communication protocol stack. According to an embodiment, the transmission radio resource 620 of the wireless communication circuit 440 may be allocated to the first communication protocol stack during the fifth period 622. As an example, the fifth period 622 may include the first period 602 and the third period 606 in which radio resources are allocated to the first communication protocol stack based on the request of the first communication protocol stack, and the second period 604 in which the reception radio resource 600 is allocated to the second communication protocol stack.

Figure 7:
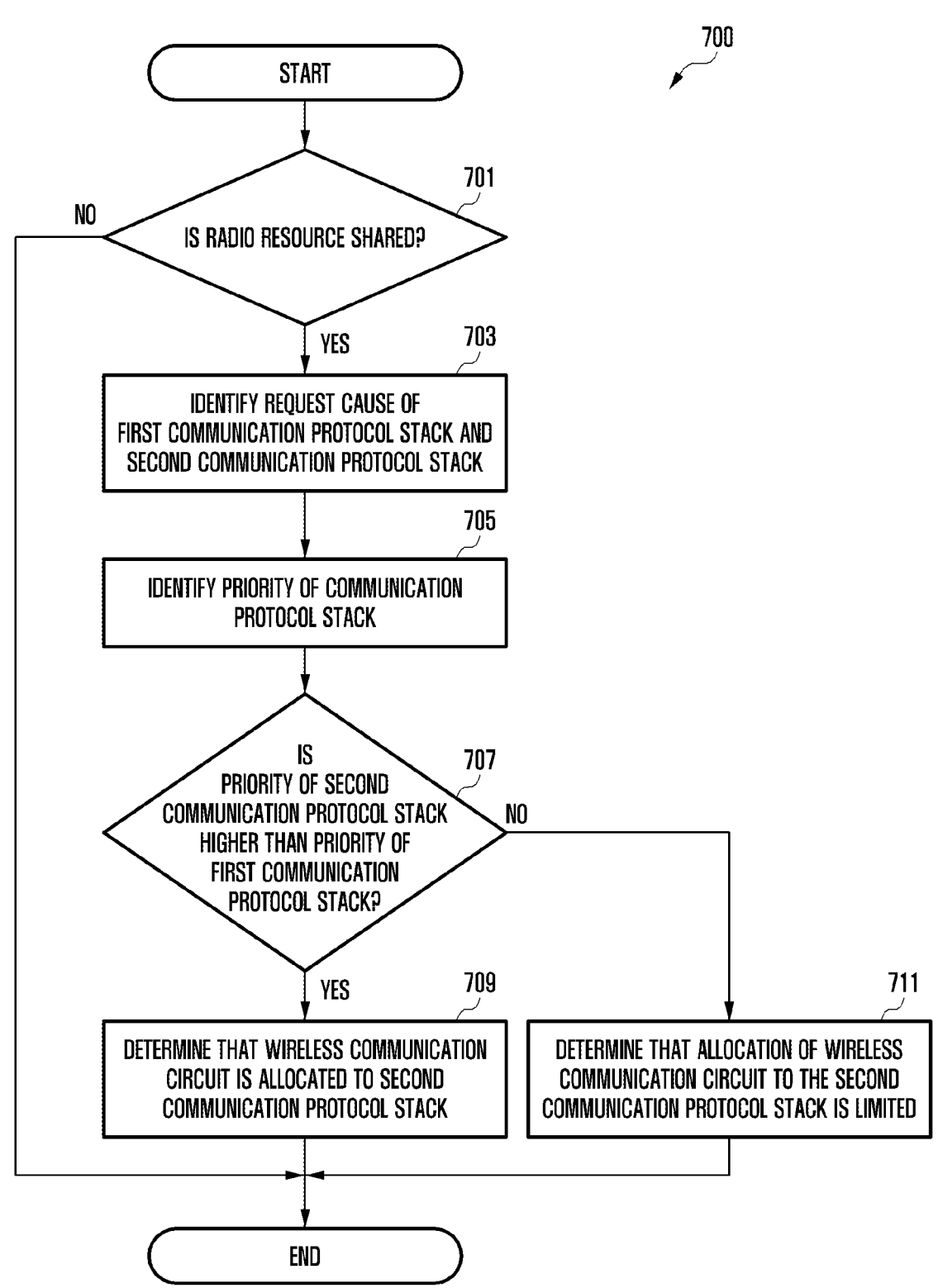
FIG. 7 is a flowchart illustrating an example process for determining whether radio resources are allocated based on priorities of communication protocol stacks in an electronic device, according to various embodiments.

FIG. 7 is a flowchart 700 illustrating an example process for determining whether radio resources are allocated based on priorities of communication protocol stacks in an electronic device, according to various embodiments. According to an embodiment, the operations of FIG. 7 may be detailed operations of operations 505 to 507 of FIG. 5. Operations in the following embodiments may be performed sequentially, but are not necessarily performed sequentially. For example, the order of operations may be changed, or at least two operations may be performed in parallel. As an example, the electronic device of FIG. 7 may be the electronic device 101 of FIG. 1, 2, or 3 or the electronic device 400 of FIG. 4.

Referring to FIG. 7, according to various embodiments, in operation 701, an electronic device (e.g., the processor 120 of FIG. 1 or the processor 410 of FIG. 4) may identify whether the first communication protocol stack and the second communication protocol stack share radio resources when the second communication protocol stack requests the use of the radio resource (e.g., a transmission radio path and/or a reception radio path) of the wireless communication circuit (e.g., the wireless communication circuit 440 of FIG. 4) (e.g., 'Yes' in operation 503 of FIG. 5). According to an embodiment, the processor 410 may identify whether the first communication protocol stack and the second communication protocol stack share radio resources of the wireless communication circuit 440 based on frequency bands used for wireless communication in the first communication protocol stack and the second communication protocol stack. For example, a combination of frequency bands in which the first communication protocol stack and the second communication protocol stack may share radio resources of the wireless communication circuit 440 may be defined as illustrated in Table 1 below.

TABLE 1

| First communication protocol stack | Second communication protocol stack |
|---|---|
| B1 | B5, B8, B20 |
| | B7, B38, B39, B40, B41 |
| | B3 |
| B2 | B5, B8, B20 |
| | B7, B38, B39, B40, B41 |
| | B4 |
| B3 | B5, B8, B20 |
| | B7, B38, B39, B40, B41 |
| | B1 |
| B4 | B5, B8, B20 |
| | B7, B38, B39, B40, B41 |
| | B2 |
| B5, B8, B20 | B1, B2, B3, B4 |

TABLE 1-continued

| First communication protocol stack | Second communication protocol stack |
|---|---|
| | B7, B38, B39, B40, B41 |
| B7 | B5, B8, B20 |
| | B1, B2, B3, B4 |
| | B40 |
| B38 | B5, B8, B20 |
| | B1, B2, B3, B4 |
| | B40 |
| B39 | B5, B8, B20 |
| | B1, B2, B3, B4 |
| B40 | B5, B8, B20 |
| | B1, B2, B3, B4 |
| | B7 |
| | B38 |
| | B41 |
| B41 | B5, B8, B20 |
| | B1, B2, B3, B4 |
| | B40 |

For example, the processor 410 may determine that the first communication protocol stack and the second communication protocol stack share radio resources of the wireless communication circuit 440 with reference to Table 1 when the first communication protocol stack uses a frequency band of B38 (e.g., about 2.6 GHz) and the second communication protocol stack uses a frequency band of B40 (e.g., about 2.35 GHz).

According to various embodiments, the electronic device (e.g., the processor 120 or 410) may terminate an embodiment for determining whether to allocate radio resources when the first communication protocol stack and the second communication protocol stack do not share radio resources (e.g., 'No' in operation 701). According to an embodiment, when the first communication protocol stack and the second communication protocol stack independently use radio resources, the processor 410 may allocate radio resources to the second communication protocol stack regardless of whether the first communication protocol stack performs wireless communication.

According to various embodiments, in operation 703, the electronic device (e.g., the processor 120 or 410) may identify the request cause for radio resources of the first communication protocol stack and the second communication protocol stack when the first communication protocol stack and the second communication protocol stack share the radio resources (e.g., 'Yes' in operation 701). According to an embodiment, the processor 410 may identify the request cause of the first communication protocol stack received from the first communication protocol stack and stored in the memory 450 when the first communication protocol stack requests the radio resources. According to an embodiment, when the second communication protocol stack requests radio resources (e.g., 'Yes' in operation 503 of FIG. 5), the processor 410 may identify the request cause of the second communication protocol stack received by the processor 410 from the second communication protocol stack.

According to various embodiments, in operation 705, the electronic device (e.g., the processor 120 or 410) may identify radio resource allocation priorities based on the request cause of requesting radio resources of the first communication protocol stack and the second communication protocol stack. According to an embodiment, when the request cause of requesting the first communication protocol stack is data transmission and the request cause of requesting the second communication protocol stack is paging monitoring, the processor 410 may determine that the radio resource allocation priority of the second communication protocol stack is relatively high.

According to various embodiments, in operation 707, the electronic device (e.g., the processor 120 or 410) may identify whether the radio resource allocation priority of the second communication protocol stack is higher than the radio resource allocation priority of the first communication protocol stack.

According to various embodiments, in operation 709, the electronic device (e.g., the processor 120 or 410) may determine that radio resources are allocated to the second communication protocol stack when the radio resource allocation priority of the second communication protocol stack is higher than the radio resource allocation priority of the first communication protocol stack (e.g., 'Yes' in operation 707). According to an embodiment, when it is determined that radio resources are allocated to the second communication protocol stack (e.g., 'Yes' in operation 507 of FIG. 5 or operation 709 of FIG. 7), the processor 410 may determine whether to allocate transmission radio resources to the second communication protocol stack based on the request cause of the first communication protocol stack and the second communication protocol stack (e.g., operation 509 of FIG. 5).

According to various embodiments, in operation 711, the electronic device (e.g., the processor 120 or 410) may determine that allocation of radio resources to the second communication protocol stack is limited when the radio resource allocation priority of the second communication protocol stack is lower than or equal to the radio resource allocation priority of the first communication protocol stack (e.g., 'No' in operation 707). According to an embodiment, when it is determined that the allocation of radio resources to the second communication protocol stack is limited (e.g., 'No' in operation 507 of FIG. 5 or operation 711 of FIG. 7), the processor 410 may control the wireless communication circuit 440 to transmit and/or receive signals (or data) through the first wireless network related to the first communication protocol stack.

According to various embodiments, when the priorities of the first communication protocol stack and the second communication protocol stack are the same, the electronic device 400 may allocate radio resources to the first communication protocol stack or the second communication protocol stack based on a specified resource allocation method. According to an embodiment, the processor 410 may select the communication protocol stack to which radio resources are to be allocated based on at least one of predefined communication priorities of the first and second communication protocol stacks, a radio resource request time point, or whether the radio resource is occupied. As an example, the predefined communication priority order may include predefined information on which communication protocol stack of the first communication protocol stack and the second communication protocol stack is to be used first.

Figure 8:
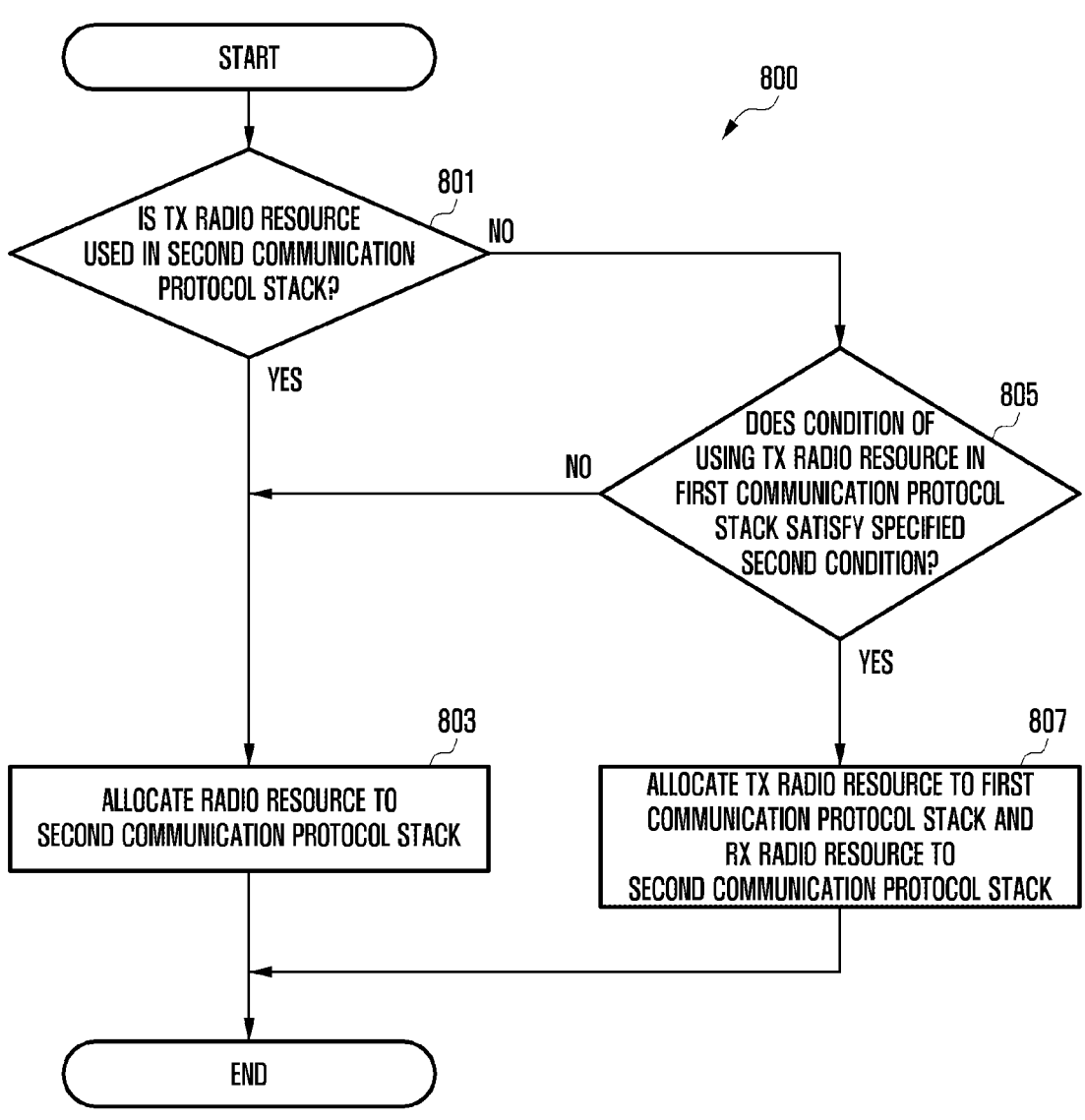
FIG. 8 is a flowchart illustrating an example process for allocating radio resources to at least one communication protocol stack in an electronic device, according to various embodiments.

FIG. 8 is a flowchart 800 illustrating an example process for allocating radio resources to at least one communication protocol stack in an electronic device, according to various embodiments. According to an embodiment, the operations of FIG. 8 may be detailed operations of operations 509 to 511 and 515 of FIG. 5. Operations in the following embodiments may be performed sequentially, but are not necessarily performed sequentially. For example, the order of operations may be changed, or at least two operations may be performed in parallel. As an example, the electronic device of FIG. 8 may be the electronic device 101 of FIG. 1, 2, or 3 or the electronic device 400 of FIG. 4.

Referring to FIG. 8, according to various embodiments, in operation 801, an electronic device (e.g., the processor 120 of FIG. 1 or the processor 410 of FIG. 4) may identify whether communication with the second wireless network through the second communication protocol stack requires transmission radio resources based on the request cause of the second communication protocol stack when it is determined that the radio resources (e.g., a transmission radio path and/or a reception radio path) of the wireless communication circuit (e.g., the wireless communication circuit 440 of FIG. 4) are allocated to the second communication protocol stack (e.g., 'Yes' in operation 507 of FIG. 5 or operation 709 of FIG. 7). According to an embodiment, when the second communication protocol stack performs paging monitoring related to the second wireless network, system information acquisition (e.g., MIB/SIB reading, ETWS, CMAS), multimedia broadcast multicast service (MBMS), cell selection, cell reselection, or wireless communication related to measurement, the processor 410 may determine that communication with the second wireless network does not require transmission radio resources. According to an embodiment, the processor 410 may determine that the second communication protocol stack requires transmission radio resources when performing wireless communication related to radio resource control (RRC) signaling related to the second wireless network.

According to various embodiments, in operation 803, the electronic device (e.g., the processor 120 or 410) may allocate radio resources (e.g., a transmission RF path and a reception RF path) of the wireless communication circuit (e.g., the wireless communication circuit 440 of FIG. 4) to the second communication protocol stack when communication with the second wireless network by the second communication protocol stack requires transmission radio resources based on the request cause of the second communication protocol stack (e.g., 'Yes' in operation 801).

According to various embodiments, in operation 805, the electronic device (e.g., the processor 120 or 410) may identify whether the request of the radio resource of the first communication protocol stack satisfies a specified condition when communication with the second wireless network by the second communication protocol stack does not require transmission radio resources based on the request cause of the second communication protocol stack (e.g., 'No' in operation 801). According to an embodiment, when it is determined that transmission radio resources are used for transmission of a control signal using a reference signal (e.g., an SRS) and/or a PUCCH based on the request cause of the first communication protocol stack, the processor 410 may determine that the specified condition is satisfied.

According to various embodiments, in operation 803, the electronic device (e.g., the processor 120 or 410) may allocate radio resources (e.g., a transmission RF path and a reception RF path) of the wireless communication circuit (e.g., the wireless communication circuit 440 of FIG. 4) to the second communication protocol stack when the request cause for the radio resource of the first communication protocol stack does not satisfy the specified condition (e.g., 'No' in operation 805).

According to various embodiments, in operation 807, the electronic device (e.g., the processor 120 or 410) may allocate the transmission radio resource (e.g., a transmission RF path) to the first communication protocol stack and the reception radio resource (e.g., a reception RF path) to the second communication protocol stack when the request cause for the radio resource of the first communication protocol stack satisfies the specified condition (e.g., 'Yes' in operation 805). According to an embodiment, the processor 410 may allocate the reception radio resource (e.g., a reception RF path) to the second communication protocol stack while maintaining the allocation of the transmission radio resource (e.g., a transmission RF path) of the wireless communication circuit 440 to the first communication protocol stack.

According to various embodiments, the first communication protocol stack and the second communication protocol stack may return radio resources when the use of the radio resources ends when periodically performing wireless communication such as paging monitoring. According to an embodiment, the second communication protocol stack may return the reception radio resource 600 when the use of the reception radio resource 600 for paging monitoring ends in the second period 604 of FIG. 6. For example, the first communication protocol stack may perform wireless communication using the reception radio resource 600 during the third interval 606 based on the return of the reception radio resource 600 by the second communication protocol stack.

Figure 9:
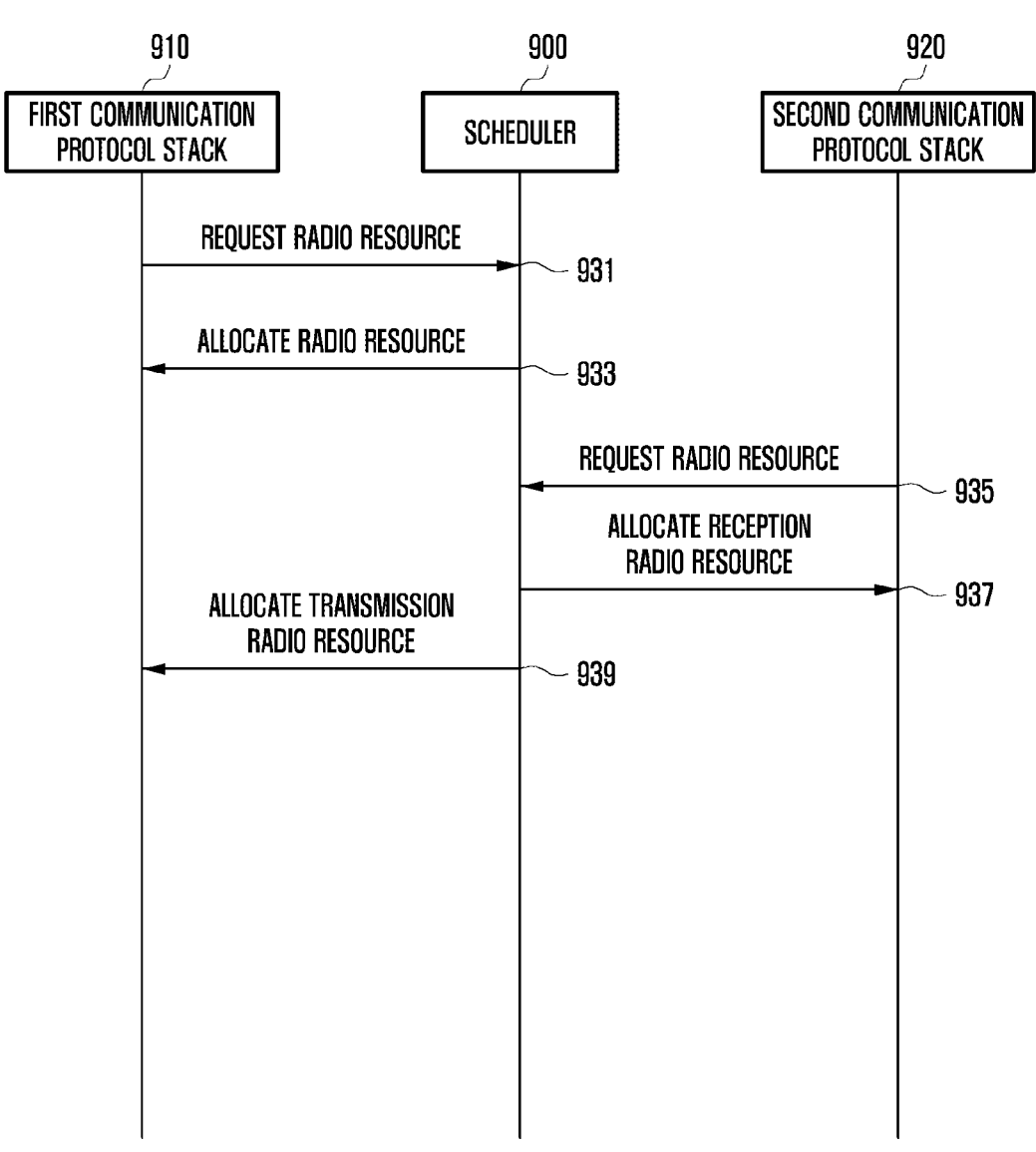
FIG. 9 is a signal flow diagram illustrating an example process for allocating radio resources to at least one communication protocol stack in an electronic device, according to various embodiments.

FIG. 9 is a signal flow diagram illustrating an example process for allocating radio resources to at least one communication protocol stack in an electronic device, according to various embodiments.

Referring to FIG. 9, according to various embodiments, when detecting the occurrence of an event related to wireless communication, a first communication protocol stack 910 corresponding to the first subscriber identity module 420 may request radio resources from a scheduler 900 (operation 931). For example, the scheduler 900 may include a module (e.g., including various circuitry and/or executable program instructions) for allocating radio resources in the processor 410 of FIG. 4.

According to various embodiments, when a second communication protocol stack 920 corresponding to the second subscriber identity module 430 does not use the radio resources of the wireless communication circuit 440, the scheduler 900 may allocate the radio resources of the wireless communication circuit 440 to the first communication protocol stack 910. The scheduler 900 may transmit information related to radio resource allocation to the first communication protocol stack 910 (operation 933).

According to various embodiments, the first communication protocol stack 910 may transmit and/or receive signals and/or data with an external device through the wireless communication circuit 440 based on information related to the radio resource allocation received from the scheduler 900.

According to various embodiments, when detecting the occurrence of an event related to the wireless communication, the second communication protocol stack 920 may request radio resources from the scheduler 900 (operation 935).

According to various embodiments, the scheduler 900 may allocate radio resources (e.g., a transmission RF path and/or a reception RF path) of the wireless communication circuit 440 to the first communication protocol stack 910 and/or the second communication protocol stack 920 based on the request cause of the first communication protocol stack 910 allocating radio resources and the request cause of the second communication protocol stack 920 requesting the use of the radio resources. According to an embodiment, when communication with the second wireless network by the second communication protocol stack 920, which has a relatively high priority related to radio resource allocation, does not use transmission radio resources (e.g., a transmission RF path) and transmits a control signal using a reference signal (e.g., a SRS) and/or a PUCCH for transmission radio resources through communication with the first wireless network by the first communication protocol stack 910, the scheduler 900 may allocate transmission radio resources (e.g., a transmission RF path) to the first communication protocol stack 910 and allocate reception radio resources (e.g., a reception RF path) to the second communication protocol stack 920.

According to various embodiments, when the transmission radio resource (e.g., a transmission RF path) is allocated to the first communication protocol stack 910 and the reception radio resource (e.g., a reception RF path) is allocated to the second communication protocol stack 920, the scheduler 900 may transmit information related to the allocation of reception radio resources to the second communication protocol stack 920 (operation 937) and transmit information related to the allocation of transmission radio resources to the first communication protocol stack 910 (operation 939). According to an embodiment, when only transmission radio resources are allocated, the first communication protocol stack 910 may transmit only reference signals and/or control signals that do not require feedback from an external device using transmission radio resources.

According to various embodiments, the allocating the reception radio resource to the first communication protocol stack 910 and/or the second communication protocol stack 920 may be performed during a predetermined time interval. As an example, the predetermined time interval may include a predetermined amount of time (ms), one or more predetermined slots, or predetermined symbols. For example, when a predetermined time interval elapses, the radio resources allocated to the first communication protocol stack 910 and/or the second communication protocol stack 920 may be automatically allocated to the communication protocol stack that originally used the radio resource.

According to various embodiments, the first communication protocol stack 910 may receive a signal from an external device through the wireless communication circuit 440 based on information related to allocation of reception radio resources received from the scheduler 900.

Figure 10:
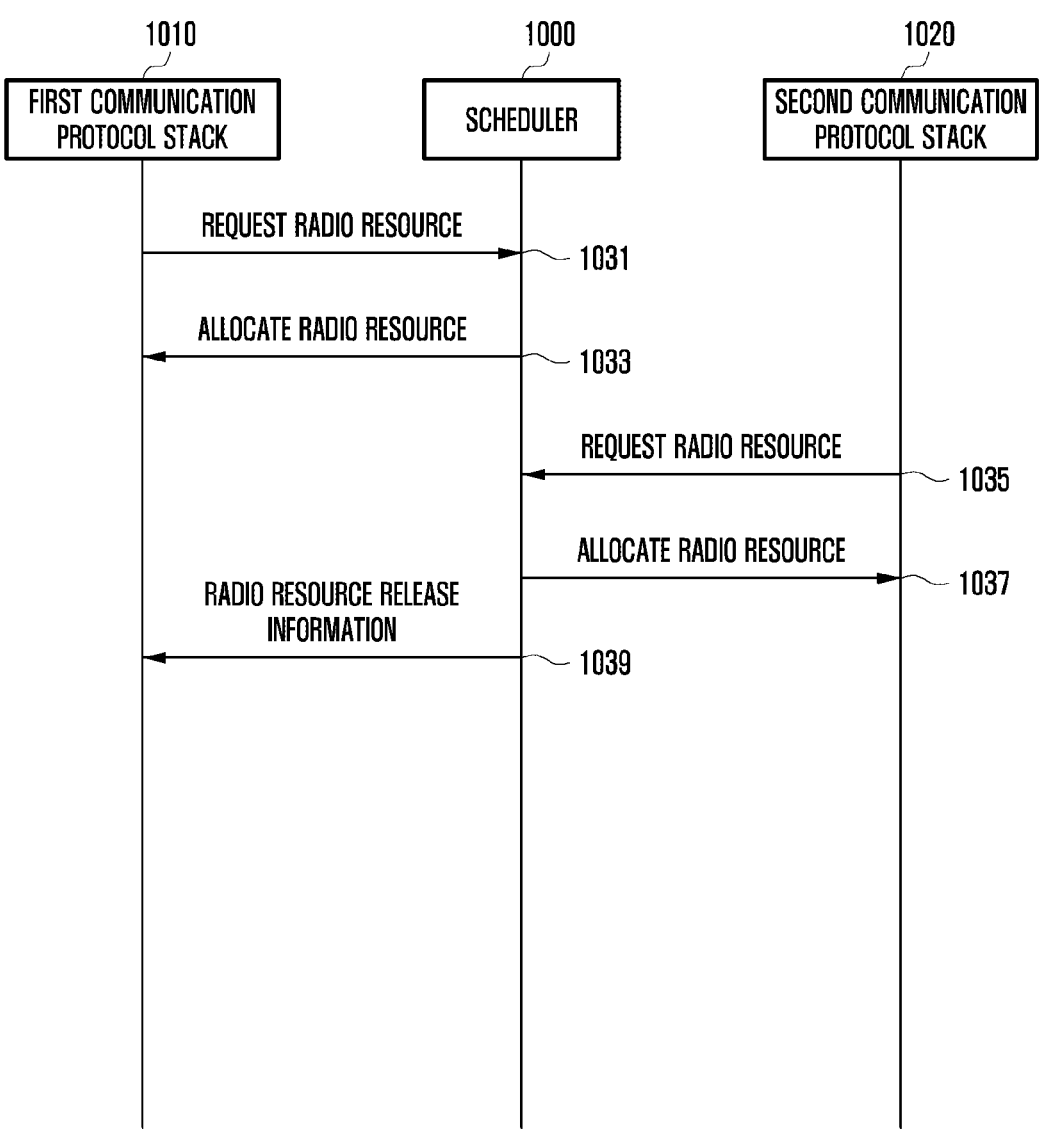
FIG. 10 is a signal flow diagram illustrating an example process for allocating radio resources to at least one communication protocol stack in an electronic device, according to various embodiments.

FIG. 10 is a signal flow diagram illustrating an example process for allocating radio resources to at least one communication protocol stack in an electronic device, according to various embodiments.

Referring to FIG. 10, according to various embodiments, when detecting the occurrence of an event related to wireless communication, a first communication protocol stack 1010 of the first subscriber identity module 420 may request radio resources from a scheduler 1000 (operation 1031). For example, the scheduler 1000 may include a module for allocating radio resources in the processor 410 of FIG. 4.

According to various embodiments, when a second communication protocol stack 1020 of the second subscriber identity module 430 does not use the radio resources of the wireless communication circuit 440, the scheduler 1000 may allocate the radio resources of the wireless communication circuit 440 to the first communication protocol stack 1010. The scheduler 1000 may transmit information related to radio resource allocation to the first communication protocol stack 1010 (operation 1033).

According to various embodiments, the first communication protocol stack 1010 may transmit and/or receive signals and/or data with an external device through the wireless communication circuit 440 based on information related to the radio resource allocation received from the scheduler 1000.

According to various embodiments, when detecting the occurrence of an event related to the wireless communication, the second communication protocol stack 1020 may request radio resources from the scheduler 1000 (operation 1035).

According to various embodiments, the scheduler 1000 may allocate radio resources (e.g., a transmission RF path and a reception RF path) of the wireless communication circuit 440 to the first communication protocol stack 1010 and/or the second communication protocol stack 1020 based on the request cause of the first communication protocol stack 1010 allocating radio resources and the request cause of the second communication protocol stack 1020 requesting the use of the radio resources. According to an embodiment, when communication with the second wireless network by the second communication protocol stack 1020, which has a relatively high priority related to radio resource allocation, requires transmission radio resources (e.g., a transmission RF path) or does not transmit a control signal using a reference signal (e.g., a SRS) and/or a PUCCH through communication with the first wireless network by the first communication protocol stack 1010, the scheduler 1000 may allocate transmission radio resources (e.g., a transmission RF path) and reception radio resources (e.g., a reception RF path) to the second communication protocol stack 1020.

According to various embodiments, the scheduler 1000 may transmit information related to radio resource allocation to the second communication protocol stack 1020 (operation 1037). The scheduler 1000 may transmit information related to radio resource allocation release to the first communication protocol stack 1010 (operation 1039). According to an embodiment, transmission of information related to radio resource allocation release may be omitted.

According to various embodiments, the second communication protocol stack 1020 may transmit and/or receive signals and/or data with an external device through the wireless communication circuit 440 based on information related to radio resource allocation received from the scheduler 1000.

According to various example embodiments, a method of operating an electronic device (e.g., the electronic device 101 of FIG. 1, 2, or 3 or the electronic device 400 of FIG. 4) including a plurality of subscriber identity modules may include: communicating with a first wireless network based on first subscriber identity information stored in a first subscriber identity module among the plurality of subscriber identity modules, identifying priority of communication with the first wireless network and communication with the second wireless network based on communication with the second wireless network based on second subscriber identity information stored in a second subscriber identity module among the plurality of subscriber identity modules being required, identifying information related to the request for use of the wireless communication circuit from communication with the first wireless network and communication with the second wireless network based on communication with the second wireless network having a higher priority than communication with the first wireless network, allocating transmission radio resources of the wireless communication circuit to communication with the first wireless network and allocating reception radio resources of the wireless communication circuit to communication with the second wireless network based on determining that the transmission radio resource is not used in communication with the second wireless network based on the information related to the request for use of the wireless communication circuit, and in communication with the first wireless network, a reference signal and/or a control signal that does not require feedback from an external device through the transmission radio resource may be transmitted based on the reception radio resource being allocated to communication with the second wireless network while the transmission radio resource is allocated to communication with the first wireless network.

According to various example embodiments, based on the first frequency band used for communication with the first wireless network and the second frequency band used for communication with the second wireless network satisfying specified conditions, determining that communication with the first wireless network and communication with the second wireless network share the radio resource of the wireless communication circuit may be further included.

According to various example embodiments, the priority of communication with the first wireless network and communication with the second wireless network may be configured based on a reason for requesting use of the wireless communication circuit from communication with the first wireless network and communication with the second wireless network.

According to various example embodiments, transmitting a reference signal and/or a control signal through communication with the first wireless network, and determining that communication with second wireless network does not use the transmission radio resource based on determining that communication with the second wireless network does not use the transmission radio resource may be further included.

According to various example embodiments, based on determining that a paging monitoring, a system information acquisition, a multimedia broadcast multicast service (MBMS), a cell selection, a cell reselection, intra-frequency search and measurement, inter-frequency search and measurement, inter-RAT (radio access technology) search and measurement, or a link monitoring through communication with the second wireless network, determining that communication with the second wireless network does not use the transmission radio resource may be further included.

According to various example embodiments, the reference signal may include a sounding reference signal (SRS), and the control signal may include a signal transmitted to an external device using a physical uplink control channel (PUCCH).

According to various example embodiments, when transmitting data through communication with the first wireless network, allocating the transmission radio resource and the reception radio resource of the wireless communication circuit to communication with the second wireless network may be further included.

According to various example embodiments, based on determining that the transmission radio resource is used in communication with the second wireless network, allocating the transmission radio resource and the reception radio resource of the wireless communication circuit to communication with the second wireless network may be further included.

According to various example embodiments, communication with the first wireless network may limit transmission of data and random access channel preamble through the transmission radio resource of the wireless communication circuit based on the reception radio resource being allocated to communication with the second wireless network while the transmission radio resource is allocated to communication with the first wireless network.

According to various example embodiments, based on the priority of communication with the first wireless network being higher than the priority of communication with the second wireless network, limiting allocation of radio resources to communication with the second wireless network may be further included.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. An electronic device comprising:
a first subscriber identity module comprising circuitry;
a second subscriber identity module comprising circuitry;
a wireless communication circuit comprising transmission radio path and reception radio path;
at least one processor, comprising processing circuitry, operatively connected to the first subscriber identity module, the second subscriber identity module, and the wireless communication circuit; and
memory storing instructions,
wherein the instructions, when executed by the at least one processor individually and/or collectively, cause the electronic device to:
perform, via the wireless communication circuit, communication with a first wireless network via the first subscriber identity module;
when communication with a second wireless network via the second subscriber identity module is required during the communication with the first wireless network, identify a first priority of communication with the first wireless network and a second priority of communication with the second wireless network; and
allocate the transmission radio path to the communication with the first wireless network and allocate the reception radio path to the communication with the second wireless network based on determining that the transmission radio path is not used in the communication with the second wireless network and the second priority being higher than the first priority, and
wherein the communication with the first wireless network includes transmitting a reference signal and/or a control signal that does not require feedback from an external device via the transmission radio path based on the reception radio path being allocated to the communication with the second wireless network while the transmission radio path is allocated to the communication with the first wireless network.

2. The electronic device of claim 1, wherein the instructions, when executed by the at least one processor individually and/or collectively, cause the electronic device to:
identify a first frequency band used for the communication with the first wireless network and a second frequency band used for the communication with the second wireless network; and
determine that the communication with the first wireless network and the communication with the second wireless network share the transmission radio path and the reception radio path-of the wireless communication circuit based on the first frequency band and the second frequency band satisfying specified conditions.

3. The electronic device of claim 1, wherein the first priority of the communication with the first wireless network is configured based on a reason for requesting use of the wireless communication circuit from the communication with the first wireless network, and
wherein the second priority of the communication with the second wireless network is configured based on a reason for requesting use of the wireless communication circuit from the communication with the second wireless network.

4. The electronic device of claim 1, wherein the instructions, when executed by the at least one processor individually and/or collectively, cause the electronic device to:
determine that the communication with second wireless network does not use the transmission radio path based on the reference signal and/or the control signal being transmitted via the communication with the first wireless network without transmitting a signal via determining that the communication with the second wireless network.

5. The electronic device of claim 4, wherein the instructions, when executed by the at least one processor individually and/or collectively, cause the electronic device to determine that the signal is not to be transmitted via the communication with the second wireless network based on determining that a paging monitoring, a system information acquisition, a multimedia broadcast multicast service (MBMS), a cell selection, a cell reselection, intra-frequency search and measurement, inter-frequency search and measurement, inter-RAT (radio access technology) search and measurement, or a link monitoring is performed through communication with the second wireless network.

6. The electronic device of claim 4, wherein the reference signal comprises a sounding reference signal (SRS), and
wherein the control signal comprises a signal transmitted to an external device using a physical uplink control channel (PUCCH).

7. The electronic device of claim 4, wherein the instructions, when executed by the at least one processor individually and/or collectively, cause the electronic device to allocate the transmission radio path and the reception radio path of the wireless communication circuit to the communication with the second wireless network based on transmitting data via the communication with the first wireless network.

8. The electronic device of claim 4, wherein the instructions, when executed by the at least one processor individually and/or collectively, cause the electronic device to allocate the transmission radio path and the reception radio path of the wireless communication circuit to the communication with the second wireless network based on determining that the transmission radio path is used in communication with the second wireless network.

9. The electronic device of claim 1, wherein the communication with the first wireless network limits transmission of data and random access channel preamble through the transmission radio path of the wireless communication circuit based on the reception radio path being allocated to communication with the second wireless network while the transmission radio path is allocated to communication with the first wireless network.

10. The electronic device of claim 1, wherein the instructions, when executed by the at least one processor individually and/or collectively, cause the electronic device to limit allocation of the transmission radio path and the reception radio path to the communication with the second wireless network based on the first priority being higher than the second priority.

11. A method of operating an electronic device comprising a plurality of subscriber identity modules, the method comprising:

perfoming communication with a first wireless network using a first subscriber identity module among the plurality of subscriber identity modules;

when communication with a second wireless network using a second subscriber identity module among the plurality of subscriber identity modules is required during the communication with the first wireless network, identifying a first priority of the communication with the first wireless network and a second priority of the communication with the second wireless network; and allocating transmission radio paths of a wireless communication circuit of the electronic device to the communication with the first wireless network and allocating reception radio path of the wireless communication circuit to the communication with the second wireless network based on determining that the transmission radio path is not used in the communication with the second wireless network and the second priority being higher than the first priority, wherein the communication with the first wireless network includes transmitting a reference signal and/or a control signal that does not require feedback from an external device via the transmission radio path based on the reception radio path being allocated to the communication with the second wireless network while the transmission radio path is allocated to the communication with the first wireless network.

12. The method of claim 11, wherein the first priority of the communication with the first wireless network is configured based on a reason for requesting use of the wireless communication circuit from the communication with the first wireless network, and wherein the second priority of the communication with the second wireless network is configured based on a reason for requesting use of the wireless communication circuit from the communication with the second wireless network.

13. The method of claim 11, further comprising:

determining that the communication with second wireless network does not use the transmission radio path based on the reference signal and/or the control signal being transmitted via the communication with the first wireless network without transmitting a signal via the communication with the second wireless network.

14. The method of claim 13, further comprising allocating the transmission radio path and the reception radio path of the wireless communication circuit to the communication with the second wireless network based on transmitting data via the communication with the first wireless network.

15. The method of claim 13, further comprising allocating the transmission radio path and the reception radio path of the wireless communication circuit to the communication with the second wireless network based on determining that the transmission radio path is used in the communication with the second wireless network.

16. The method of claim 13, further comprising;

determining that the signal is not to be transmitted via the communication with the second wireless network based on determining that a paging monitoring, a system information acquisition, a multimedia broadcast multicast service (MBMS), a cell selection, a cell reselection, intra-frequency search and measurement, inter-frequency search and measurement, inter-RAT (radio access technology) search and measurement, or a link monitoring is performed through communication with the second wireless network.

17. The method of claim 13, wherein the reference signal comprises a sounding reference signal (SRS), and wherein the control signal comprises a signal transmitted to an external device using a physical uplink control channel (PUCCH).

18. The method of claim 11, further comprising;

identifying a first frequency band used for the communication with the first wireless network and a second frequency band used for the communication with the second wireless network; and determining that the communication with the first wireless network and communication with the second wireless network share the transmission radio path and the reception radio path of the wireless communication circuit based on the first frequency band and the second frequency band satisfying specified conditions.

19. The method of claim 11, wherein the communication with the first wireless network limits transmission of data and random access channel preamble through the transmission radio path of the wireless communication circuit based on the reception radio path being allocated to communication with the second wireless network while the transmission radio path is allocated to communication with the first wireless network.

20. The method of claim 11, further comprising;

limiting allocation of the transmission radio path and the reception radio path to the communication with the second wireless network based on the first priority being higher than the second priority.

* * * * *